US008705878B2

(12) United States Patent  
Koike

(10) Patent No.: US 8,705,878 B2  
(45) Date of Patent: Apr. 22, 2014

(54) IMAGING APPARATUS, CHARACTER INFORMATION ASSOCIATION METHOD AND CHARACTER INFORMATION ASSOCIATION PROGRAM

(75) Inventor: Tatsunobu Koike, Kanagawa (JP)

(73) Assignee: Sony Corporation (JP)

( * ) Notice: Subject to any disclaimer, the term of this patent is extended or adjusted under 35 U.S.C. 154(b) by 697 days.

(21) Appl. No.: 12/410,507

(22) Filed: Mar. 25, 2009

(65) Prior Publication Data

US 2009/0245752 A1 Oct. 1, 2009

(30) Foreign Application Priority Data

Mar. 27, 2008 (JP) ................ P2008-084125

(51) Int. Cl.
*G06F 17/30* (2006.01)
*G06K 9/78* (2006.01)

(52) U.S. Cl.
CPC ............ *G06F 17/30253* (2013.01); *G06K 9/78* (2013.01); *G06K 2209/01* (2013.01)
USPC ............................ 382/229; 382/185; 382/181

(58) Field of Classification Search
CPC ................................................ G06F 17/30253
USPC ........................................................ 382/229
See application file for complete search history.

(56) References Cited

U.S. PATENT DOCUMENTS

| 5,987,459 A * | 11/1999 | Swanson et al. ................. 1/1 |
| 6,516,154 B1 * | 2/2003 | Parulski et al. ................ 396/287 |
| 2002/0120681 A1 * | 8/2002 | Cho et al. ...................... 709/203 |
| 2004/0150723 A1 * | 8/2004 | Seo et al. .................... 348/207.1 |
| 2005/0078190 A1 * | 4/2005 | Bloom et al. ............. 348/207.99 |
| 2007/0266312 A1 * | 11/2007 | Ayaki et al. .................. 715/526 |
| 2008/0317346 A1 * | 12/2008 | Taub ............................ 382/182 |
| 2009/0015592 A1 * | 1/2009 | S. .................................. 345/581 |
| 2010/0104187 A1 * | 4/2010 | Broadbent .................... 382/176 |

FOREIGN PATENT DOCUMENTS

| JP | 2003 9057 | 1/2003 |
| JP | 2003 274320 | 9/2003 |
| JP | 2004 147325 | 5/2004 |
| JP | 2007 306416 | 11/2007 |
| JP | 2008 22280 | 1/2008 |
| WO | WO 2005106706 A2 * | 11/2005 |

* cited by examiner

*Primary Examiner* — Matthew Henning
(74) *Attorney, Agent, or Firm* — Lerner, David, Littenberg, Krumholz & Mentlik, LLP

(57) ABSTRACT

An imaging apparatus configured to associate character information detected from an imaged picture displayed on a screen with a recorded picture displayed on the same screen including an imaging unit configured to image a subject and output an imaged picture, a picture recording unit configured to record pictures, a playback unit configured to play back a recorded picture recorded in the picture recording unit, and a character information detection unit configured to detect character information from the imaged picture outputted by the imaging unit.

14 Claims, 18 Drawing Sheets

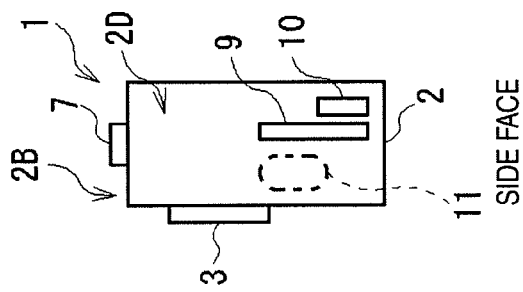
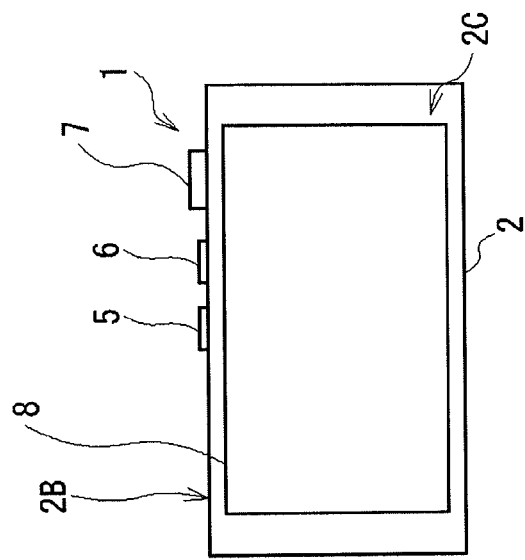
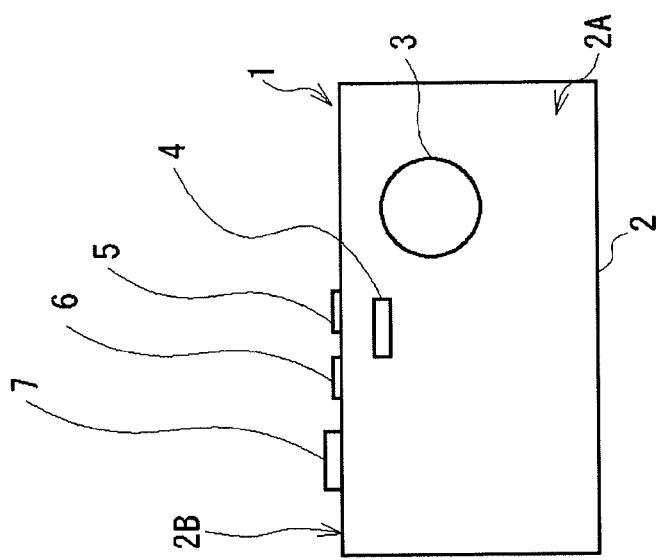

FIG. 3

| TIME SERIES GROUP ID | FILE NAME | PICTURE TAKEN DATE | LABEL NAME |
|---|---|---|---|
| 1 | C:¥...¥pictureA.jpg | JUNE 15, 2007 | WEDDING |
| 1 | C:¥...¥pictureB.jpg | JUNE 15, 2007 | WEDDING |
| 1 | C:¥...¥pictureC.jpg | JUNE 15, 2007 | BANQUET |
| 1 | C:¥...¥pictureD.jpg | JUNE 16, 2007 | BANQUET, HANAKO |
| 2 | C:¥...¥pictureE.jpg | AUGUST 3, 2007 | CAMP |
| 2 | C:¥...¥pictureF.jpg | AUGUST 4, 2007 | CAMP |
| 2 | C:¥...¥pictureG.jpg | AUGUST 4, 2007 | CAMP |
| 2 | C:¥...¥pictureH.jpg | AUGUST 4, 2007 | CAMP, HANAKO |
| ⋮ | ⋮ | ⋮ | ⋮ |

Pd points to the table. Rows link to PICTURE A through PICTURE H respectively.

IMAGING APPARATUS, CHARACTER INFORMATION ASSOCIATION METHOD AND CHARACTER INFORMATION ASSOCIATION PROGRAM

CROSS REFERENCE TO RELATED APPLICATIONS

The present invention contains subject matter related to Japanese Patent Application JP 2008-084125 filed in the Japanese Patent Office on Mar. 27, 2008, the entire contents of which being incorporated herein by reference.

BACKGROUND OF THE INVENTION

1. Field of the Invention

The invention relates to an imaging apparatus, a character information association method and a character information association program, and is preferably applied to, for example, a case in which character information is associated with a recorded picture in a digital still camera.

2. Description of the Related Art

In recent years, the digital still camera is becoming capable of recording much more pictures along with large capacity of recording media which record imaged pictures. However, it becomes difficult to find a desired picture from the pictures which have been recorded (also called as recorded pictures) as the number of pictures to be recorded increases.

Accordingly, in a digital still camera of related art, recorded pictures are displayed in a sorted manner to thereby find a desired recorded picture easily from many recorded pictures.

Specifically, the digital still camera, for example, groups recorded pictures according to time based on taken dates and time of recorded pictures and displays the pictures by aligning them in time series order by respective groups. Additionally, the recorded pictures are displayed by respective dates of taken dates and time or the recorded pictures are displayed by respective directories in which recorded pictures are recorded.

The digital still camera is capable of finding a desired picture easily from many recorded pictures by displaying recorded pictures as described above.

There exists a digital still camera in which character information to be a keyword for the recorded picture (for example, character strings such as "wedding", "athletic meet") is associated (added) as a label, and recorded pictures are displayed, to which the label designated by a user is added.

That is, in the digital still camera, the recorded pictures searched by labels are displayed to thereby find a desired picture easily from many recorded pictures.

Most of the digital still cameras do not have an input means whereby character information as the contents of labels can be inputted. The reason is that, for example, a casing size is too small to secure space in which the input means such as a keyboard is provided.

It can be considered that character information is directly inputted by displaying a graphical keyboard on a display, however, even in such case, complicated input operations such as character input, kanji conversion and the like are necessary.

According to the above reasons, the digital still camera having the label adding function allows the user to select a desired label from labels previously prepared and adds the selected label to the recorded picture.

According to the above, even the digital still camera which does not have the means for inputting character information can add labels to recorded pictures easily. However, on the other hand, labels which can be selected are limited in this digital still camera, therefore, the digital still camera is not always able to add a label including character information desired by the user to the recorded picture.

Accordingly, an apparatus in which, after a picture is imaged and recorded, character information to be a label added to the picture is imaged and recorded, thereby adding a label including character information desired by the user to the picture is proposed (for example, refer to JP-A-2004-147325 (Patent Document 1)).

SUMMARY OF THE INVENTION

However, in the above apparatus, after the picture is imaged and recorded, the process proceeds to imaging of character information to be a label added to the picture, therefore, the user has to remember what the picture to which the label is added is like at the time of adding the label.

That is, it is difficult in the apparatus to image character information and to add the label including character information while allowing the user to check the picture to be a target of label addition, therefore, it is difficult to say that the label is added to the picture easily.

As described above, it is difficult to say that association of character information with respect to pictures is performed easily in the imaging apparatus of related art.

It is desirable to provide an imaging apparatus, a character information association method and a character information association program capable of performing association of character information with respect to pictures easily as compared with related art.

According to an embodiment of the invention, there is provided an imaging apparatus including an imaging unit imaging a subject and outputting an imaged picture, a picture recording unit recording pictures, a playback unit playing back a recorded picture recorded in the picture recording unit, a character information detection unit detecting character information from the imaged picture outputted by the imaging unit, a display control unit displaying the recorded picture played back by the playback unit and the imaged picture outputted from the imaging unit on the same screen and a character information association unit associating character information detected from the imaged picture displayed on the screen by the character information detection unit with the recorded picture displayed on the same screen.

According to the above, it is possible to add character information detected from the imaged picture to the recorded picture while allowing the user to check the recorded picture to be an association target of character information as well as allowing the user to check the imaged picture by displaying the imaged picture to be a detection target of character information on the same screen.

According to an embodiment of the invention, it is possible to add character information detected from the imaged picture to the recorded picture while allowing the user to check the recorded picture to be an association target of character information as well as allowing the user to check the imaged picture by displaying the imaged picture to be a detection target of character information on the same screen. As a result, an imaging apparatus, a character information association method and a character information association program with respect to pictures, which are capable of performing association of character information with respect to pictures further easier than related art technologies.

BRIEF DESCRIPTION OF THE DRAWINGS

FIG. 1A to FIG. 1C are schematic views indicating an outline configuration of a digital still camera according to a first embodiment;

FIG. 3 is a schematic table indicating a configuration of a picture management database;

DESCRIPTION OF THE PREFERRED EMBODIMENTS

Figure 2:
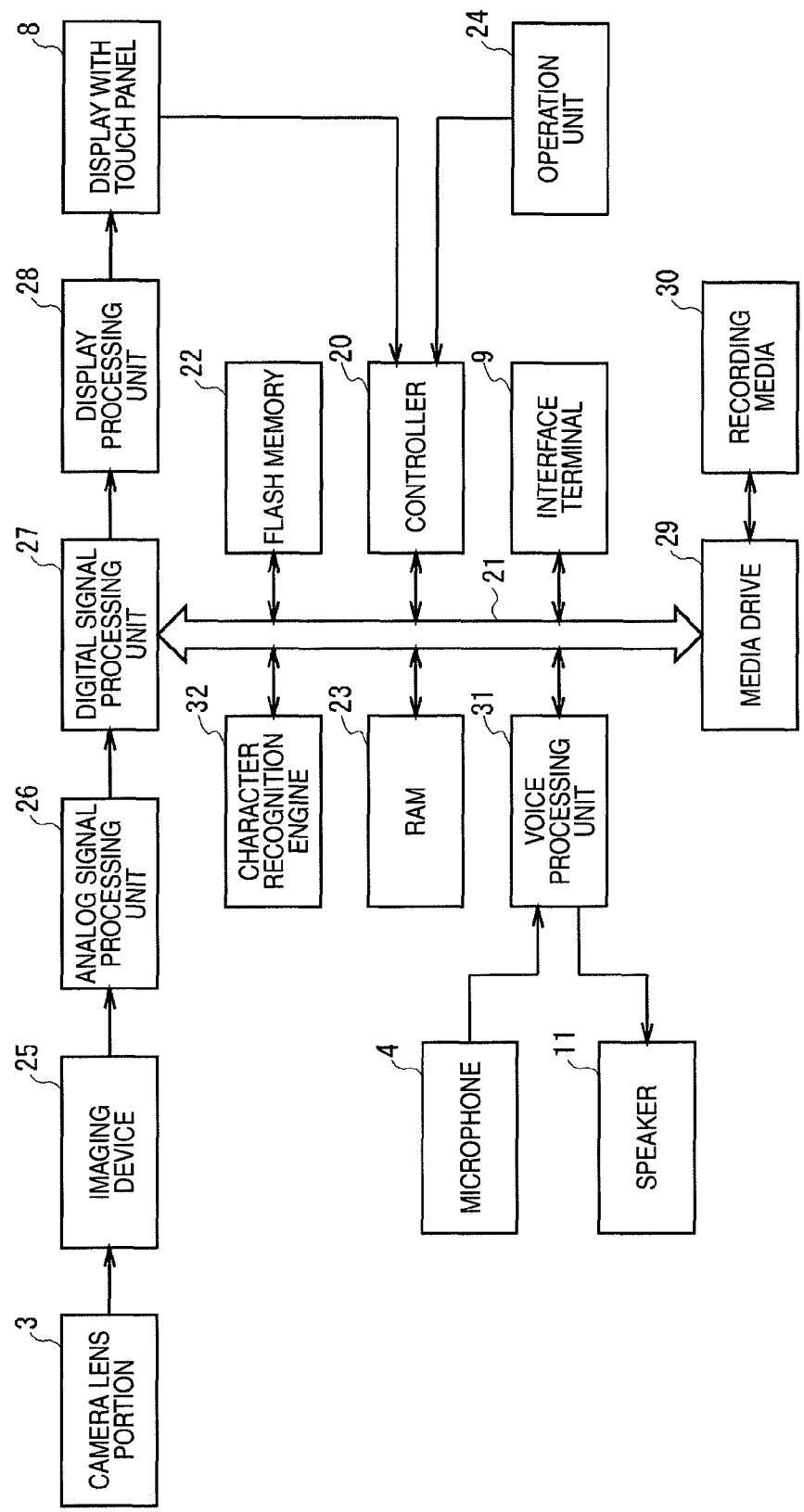
FIG. 2 is a schematic diagram showing an internal configuration of a digital still camera according to the first embodiment.

Hereinafter, embodiments of the invention will be described with reference to the drawings.

1. First Embodiment

1-1 Outline Configuration of Digital Still Camera

First, a first embodiment as one of embodiments of the invention will be explained. In FIG. 1A, FIG. 1B and FIG. 1C, 1 denotes a digital still camera having a function of taking moving pictures in addition to the function of taking still pictures as a whole. The digital still camera 1 includes a body portion 2 having a flat rectangular shape, and a camera lens portion 3 having an imaging lens, an aperture and the like for imaging a subject is provided at a prescribed position of a front face 2A. Further, a microphone 4 for recording voice is also provided at a prescribed position in the front face 2A.

On an upper face 2B of the body portion 2, a power button 5 is provided at a prescribed position thereon. The digital still camera 1 switches power on and off in response to a pressing operation of the power button 5. Further, on the upper face 2B, a mode switch button 6 and a shutter button 7 are provided in the vicinity of the power button 5. The digital still camera 1 switches a present mode from a picture taking mode to a playback mode or in a reverse manner in response to a pressing operation of the mode switch button 6. When the shutter button 7 is pressed at the picture taking mode, the digital still camera 1 takes a picture (a still picture or a moving picture).

In a back face 2C of the body portion 2, a display with a touch panel (also called as a TP display) 8 having approximately the same size as the back face 2C is provided. The digital still camera 1 displays various screens concerning the taking of pictures, playback of taken pictures, addition of labels to the taken pictures and the like on the TP display 8.

When the TP display 8 is touched by the user in a manner in which the screen displayed on the TP display 8 is touched, the digital still camera 1 receives a command corresponding to the touch operation, performing processing corresponding to the command.

In a one-side face 2D of the body portion 2, a slot 9 into which a recording medium which can record data of pictures (also called as picture data) on a prescribed position is inserted is provided.

Further, in the one-side face 2D, an interface terminal (I/F terminal) 10 for connecting to external devices through a prescribed cable (not shown) and a speaker 11 are provided in the vicinity of the slot 9. The digital still camera 1 outputs pictures to a television monitor connected through the interface terminal 10, transmitting and receiving picture data with respect to a personal computer connected through the interface terminal 10.

1-2 Internal Configuration of Digital Still Camera

Next, an internal configuration of the digital still camera 1 will be explained with reference to FIG. 2. A controller 20 controls the whole apparatus in the digital still camera 1.

Actually, the controller 20 controls the whole device by loading an arbitrary program written into a flash memory 22 connected through a bus 21 to a prescribed area in a RAM (Random Access Memory) 23 connected through the bus 21 and executing the program.

The part of the RAM 23 is also used as a buffer in which, for example, picture data of one screen is temporarily stored.

The controller 20, when recognizing that a switching operation to the picture taking mode in which pictures are taken has been performed through an operation unit 24 including the power button 5, the mode switch button 6 and the shutter button 7, switches the operation mode to the picture taking mode for still pictures.

Then, light from a subject captured by the camera lens portion 3 is converted into an electric signal by an imaging device 25 including CCDs (Charge Coupled Device) and the like, and the electric signal is transmitted to an analog signal processing unit 26. The analog signal processing unit 26 obtains a picture signal by performing prescribed analog signal processing to the transmitted electric signal, transmitting the picture signal to a digital signal processing unit 27.

The digital signal processing unit 27 transmits the transmitted picture signal to a display processing unit 28 as it is under control of the controller 20 connected through the bus 21. The display processing unit 28 generates a screen signal by performing prescribed processing to the transmitted picture signal and transmits the screen signal to a TP display 8. As a result, a screen based on the screen signal, namely, a picture of the subject captured through the imaging device 25 (also called as an imaged picture) is displayed on the TP display 8 in real time.

As described above, the digital still camera 1 displays the imaged picture captured through the imaging device 25 on the TP display 8 to thereby allow the user to check the subject to be an imaging target. The imaged picture displayed on the TP display 8 is also called as a through-the-lens picture.

The controller 20, when recognizing that that the shutter button 7 has been pressed by the user through the operation unit 24, controls the digital signal processing unit 27 to output still picture data (picture data of one frame).

That is, the digital signal processing unit 27 obtains picture data by analog-digital converting the picture signal transmitted from the analog signal processing unit 26, then, extracts picture data of one frame from the picture data and outputs the data as still picture data.

Accordingly, the still picture data outputted from the digital signal processing unit 27 is stored in a prescribed area of the RAM 23 through the bus 21, then, read by the controller 20.

The controller 20 obtains compressed still picture data by compressing the still picture data read from the RAM 23 by a prescribed compression/expansion format such as JPEG (Joint Photographic Experts Group), and writes back the data in another area in the RAM 23.

At this time, the controller 20 generates thumbnail data by reducing the picture size of still picture data read from the RAM 23. Then, the controller 20 obtains the compressed thumbnail data by compressing the thumbnail data by a prescribed compression/expansion format and stores the data in a prescribed area in the RAM 23.

The controller 20 forms a compressed still picture file by adding a file header showing the type of the compression/expansion format and the compressed thumbnail data to the compressed still picture data, transmitting the file to a media drive 29 connected through the bus 21.

The media drive 29 records the transmitted compressed still picture file in a recording medium 30 under control of the controller 20. Accordingly, the digital still camera 1 takes still pictures.

The controller 20 generates graphics data such as icons, buttons, and menus by reading a character font from the flash memory 22 and rendering the font, or by reading graphic data and decoding the data.

The graphics data is stored in a prescribed area of the RAM 23, read from the RAM 23 and transmitted to the digital signal processing unit 27 by the controller 20.

The digital signal processing unit 27 obtains a graphics signal by digital-analog converting the graphics data, and transmits the graphics signal to the display processing unit 28 with the picture signal. The display processing unit 28 superimposes the graphics signal on the picture signal and performs prescribed display processing to generate a screen signal, transmitting the screen signal to the TP display 8. As a result, in addition to the picture (for example, the picture of the imaged subject), a screen on which icons, buttons, menus and the like are arranged so as to be superimposed on prescribed positions in the picture is displayed on the TP display 8.

The TP display 8, when the TP display 8 is touched by the user in the manner in which the displayed icons, buttons, menus and the like are touched, notifies the touched position to the controller 20. The controller 20 receives a command corresponding to an icon, a button or a menu displayed at the touched position based on the notification, performing processing corresponding to the command.

As described above, the digital still camera 1 performs processing in response to the touch operation with respect to icons, buttons and menus displayed on the TP display 8.

Here, assume that the touch operation of, for example, switching from the taking of still pictures to the taking of moving pictures is performed by the user. Then, the controller 20 switches the operation mode from the picture taking mode for still pictures to the picture taking mode for moving pictures.

Then, in the same manner as the picture taking mode for still pictures, an imaged picture captured by the imaging device 25 is displayed as it is on the TP display 8.

When the shutter button 7 is pressed by the user through the operation unit 24, the controller 20 recognizes that the start of taking of a moving picture has been instructed, controlling the digital signal processing unit 27 so as to output moving picture data.

That is, the digital signal processing unit 27 obtains moving picture data by analog-digital converting the picture signal transmitted from the analog signal processing unit 26, outputting the moving picture data.

The moving picture data outputted from the digital signal processing unit 27 as described above is stored in a prescribed area of the RAM 23 through the bus 21 by a prescribed amount data as well as read by the controller 20 by a prescribed amount of data.

The controller 20 obtains compressed moving picture data by compressing the moving picture data read from the RAM 23 by a prescribed compression/expansion format such as MPEG (Moving Picture Coding Experts Group), writing back the data in another area in the RAM 23.

At this time, the controller 20 generates thumbnail data by extracting still picture data of an arbitrary frame from the moving picture data and by reducing the picture size of the still picture data. Then, the controller 20 compresses the thumbnail data by the prescribed compression/expansion format, then, stores the data in a prescribed area of the RAM 23.

Further, at this time, voice around the digital still camera 1 is collected by the microphone 4 and converted into a voice signal, then, the voice signal is transmitted to a voice processing unit 31. The voice processing unit 31 obtains voice data by analog-digital converting the transmitted voice signal and outputs the voice data.

The voice data outputted from the voice processing unit 31 is stored in a prescribed area of the RAM 23 through the bus 21 by a prescribed amount of data, then, read by the controller 20 by a prescribed amount of data.

The controller 20 obtains compressed voice data by compressing voice data read from the RAM 23 by a prescribed compression/expansion format such as MPEG (Moving Picture Coding Experts Group), and writes back the data in another area of the RAM 23.

The controller 20 reads the compressed moving picture data and the compressed voice data from the RAM 23 at any time, generates a moving picture stream by time-division multiplexing the compressed moving picture data and the compressed voice data, transmitting the stream to the media drive 29.

The media drive 29 records the transmitted moving picture stream in the recording medium 30 under control of the controller 20.

After that, when the shutter button 7 is pressed again by the user through the operation unit 24, the controller 20 recognizes that end of the taking of the moving picture has been instructed, controlling the digital signal processing unit 27 to stop the output of the moving picture data.

Then, the controller 20 transmits the moving picture stream existing in the RAM 23 to the recording medium 30 and the records it therein, and ends the recording of a series of the moving picture stream from the beginning to the end of the picture taking. Then, the controller 20 finally records the moving picture stream as a compressed moving picture file by adding a file header and compressed thumbnail data to the moving picture stream. Accordingly, the digital still camera 1 takes (namely records) the moving picture.

The controller 20, when recognizing the switching operation from the picture taking mode to the playback mode in which pictures are displayed has been performed through the operation unit 24, switches the operation mode from the picture taking mode to the playback mode.

Then, the controller 20 controls the media drive 29 to read a picture file designated by the user from the recording medium 20, storing the file in a prescribed area of the RAM 23.

When the picture file is a still picture file, the controller 20 extracts compressed still picture data from the still picture file and expands the compressed still picture data by the compression/expansion format which is the same as the format used at the time of compression.

As a result, the controller 20 obtains the original still picture data and writes back the data in a prescribed area of the RAM 23. The controller 20 reads the still picture data from the RAM 23 and transmits the data to the digital signal processing unit 27.

The digital signal processing unit 27 obtains a picture signal by digital-analog converting the transmitted still picture data, transmitting the signal to the display processing unit 28. As a result, the still picture based on picture signals is displayed on the TP display 8 through the display processing unit 28. Accordingly, the digital still camera 1 plays back (namely, displays) the still picture.

On the other hand, when the picture file is a moving picture file, the controller 20 extracts compressed moving picture data and compressed voice data from the moving picture file while using the RAM 23 as a buffer. Further, the controller 20 obtains the original moving picture data by expanding the compressed moving picture data by the compression/expansion format which is the same as the format used at the time of compression and writes back the data in another area of the RAM 23. The controller 20 further obtains the original voice data by expanding the compressed voice data by the compression/expansion format which is the same as the format used at the time of compression and writes back the data in another area of the RAM 23.

The controller 20 reads moving picture data and voice data from the RAM 23 by a prescribed amount of data, transmitting the moving picture data to the digital signal processing unit 27 and transmitting the voice data to the voice processing unit 31.

The signal processing unit 27 obtains a picture signal by digital-analog converting the transmitted moving picture data, transmitting the data to the display processing unit 28. As a result, the moving picture based on the picture signal is displayed on the TP display 8 through the display processing unit 28.

The voice processing unit 31 obtains a voice signal by converting digital-analog converting the transmitted voice data, transmitting the signal to the speaker 11. As a result, voice based on the voice signal is outputted from the speaker. Accordingly, the digital still camera 1 plays back the moving picture.

In the digital still camera 1, picture files recorded in the recording medium 30 (compressed still picture files and compressed moving picture files) are managed by a picture management database Pd shown in FIG. 3 which is built in the recording medium 30.

Actually, in the picture management database Pd, a time series group ID, a file name, a picture taken date and a label name are registered as management information by each picture file recorded in the recording media 30.

Here, the time series group ID indicates an identification number of a group to which respective picture files belong when picture files are grouped according to time based on taking dates of pictures. The controller 20 recognizes the time series group to which respective picture files belong based on the time series group ID. The picture taken date indicates a date when the picture has been taken (they may include hour, minute and second).

The file name indicates a name of a picture file. The file name includes a path which is a storage location of a picture file. The controller 20 recognizes the storage location of each picture file (for example, a portion, "C:¥ . . . £" in "C:¥ . . . ¥ pictureA.jpg" and a name (for example, a portion "picturea.jpg" in "C:¥ . . . ¥pictureA.jpg") based on the file name. That is, the controller 20 associates management information with the picture file based on the file name.

The file name also includes an identifier (for example, a portion ".jpg" in "C:¥ . . . ¥pictureA.jpg") indicating that the picture file is either the compressed still picture file or the compressed moving picture file. Therefore, the controller 20 can also recognize whether the picture file is the compressed still picture file or the compressed moving picture file based on the file name.

The label name indicates a name of a label added to the picture file (addition of the label will be described later). When a label is not added to the picture file, for example, "null" is written as the label name in management information of the picture file. Therefore, the controller 20 can also recognize whether the label is added to the picture file or not based on the label name. Further, plural labels can be added to the picture file, and when plural labels are added, plural label names (for example, "banquet" "Hanako") are written in management information of the picture file.

The controller 20 adds management information of the picture file to the picture management database Pd every time a new picture file is recorded. The controller 20 also updates management information registered in the picture management database Pd if necessary, for example, in the case that a new label is added to the recorded picture file.

In the digital still camera 1, it is also possible that recorded pictures (actually, thumbnails) are displayed in a list in a sorted state at the playback mode by using management information registered in the picture management database Pd. Here, a case in which thumbnails of still pictures are displayed will be explained for simple explanation.

For example, assume that a touch operation of displaying the recorded still pictures (namely, the recorded pictures) according to the time series group ID is performed by the user at the playback mode. Then, the controller 20 extracts management information including, for example, the time series group ID of the smallest number from the picture management database Pd, sequentially reading still picture files corresponding to the respective extracted management information from the recording medium 30 and storing them in a prescribed area of the RAM 23.

The controller 20 further extracts compressed thumbnail data from the still picture files and expands the compressed thumbnail data.

As a result, the controller 20 obtains original thumbnail data, writing back the data in another area of the RAM 23. When the predetermined number (for example, the number which can be displayed) of thumbnail data is written back in the RAM 23, the controller 20 sequentially reads the thumbnail data from the RAM 23 and transmits the data to the digital signal processing unit 27.

The controller 20 generates necessary graphics data and transmits the data to the digital signal processing unit 27.

The above data is sequentially processed in the digital signal processing unit 27 and the display processing unit 28, thereby generating a screen signal of a screen (also called as a list screen according to a time series group) which displays a list of thumbnails according to the time series group. Then, the screen signal is transmitted from the display processing unit 28 to the TP display 8.

Figure 4A:
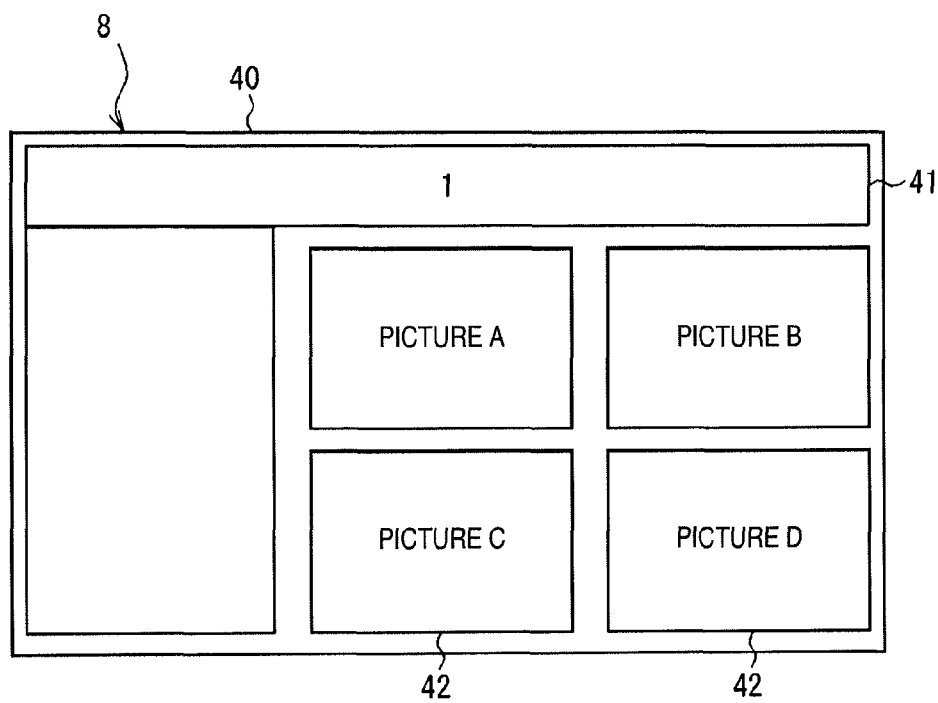
FIG. 4A and FIG. 4B are schematic views showing a configuration of a list screen according to a time series group.

As a result, a list screen according to the time series group 40 is displayed on the TP display 8 as shown in FIG. 4A.

Specifically, in the list screen according to the time series group 40, the time series group ID is written in a frame 41 displayed at an upper end, and thumbnails 42 of still pictures belonging to the time series group ID written in the frame 41 are displayed in a list in a lattice form under the frame 41.

In the list screen according to the time series group 40 shown in FIG. 4A, only four thumbnails 42 of vertical 2× horizontal 2 are displayed at a time, however, other thumbnails 42 can be displayed in sequence by scrolling the thumbnails 42 in a given direction in response to a predetermined touch operation.

Here, assume that a predetermined touch operation of selecting one of the thumbnails 42 displayed in the list screen according to the time series group 40 is performed by the user. Then, the controller 20 extracts compressed still picture data from the still picture file in which the selected thumbnail 42 is included, and plays back the data.

Figure 5:
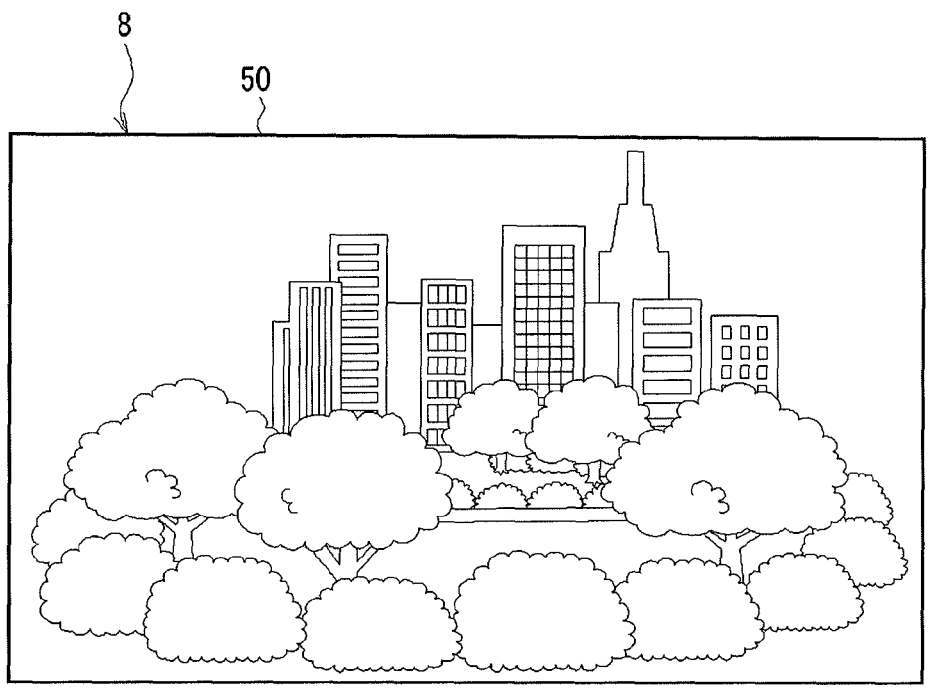
FIG. 5 is a schematic view for explaining display of a selected still picture.

As a result, a still picture corresponding to the selected thumbnail is displayed all over the display surface of the TP display 8 as shown in FIG. 5.

On the other hand, assume that a touch operation of displaying pictures belonging to the next time-series group ID is performed by the user in a state in which the list screen according to the time series 40 shown in FIG. 4A is displayed. Then, the controller 20 extracts management information including the next time-series group ID from the picture management database Pd.

Subsequently, the controller 20 transmits thumbnail data of pictures belonging to the time series group ID and necessary graphics data to the digital signal processing unit 27 in the same manner as described above.

Figure 4B:
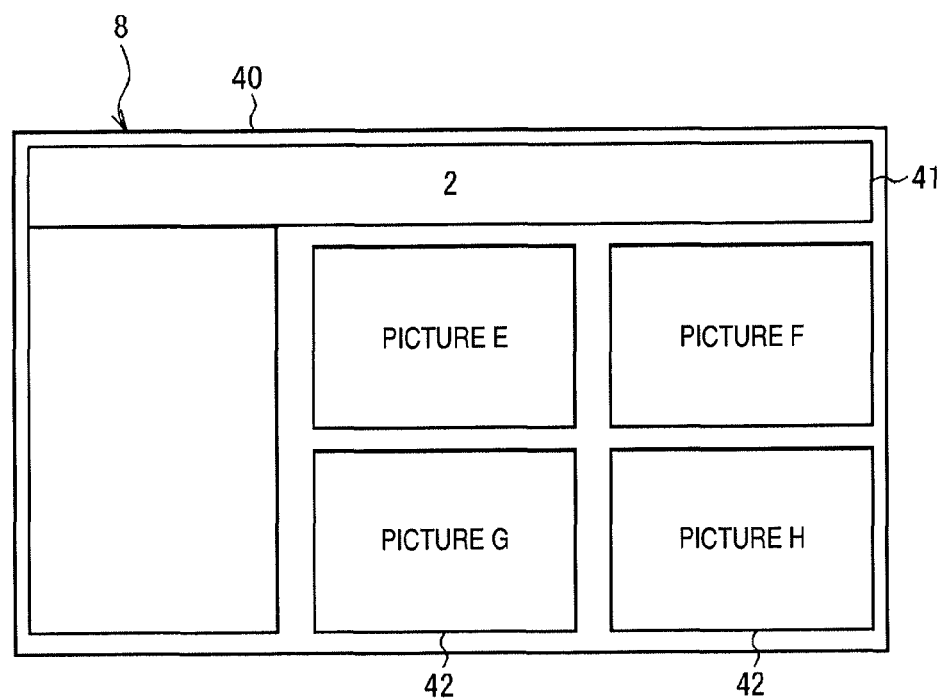

As a result, the list screen according to time series group 40 which is a list of thumbnails belonging to the next time-series group ID is displayed on the TP display 8 as shown in FIG. 4B.

As described above, the digital still camera 1 displays taken pictures according to the time series group.

Assume that a touch operation of displaying taken pictures according to the picture taken date is performed by the user. Then, the controller 20 extracts management information from the picture management database Pd according to, for example, the picture taken date from the oldest picture taken date. The controller 20 sequentially reads still picture files corresponding to the extracted management information from the recording medium 30, storing the files in a prescribed area of the RAM 23.

Further, the controller 20 extracts compressed thumbnail data from the still picture files and expands the compressed thumbnail data by the compression/expansion format which is the same format used at the compression.

As a result, the controller 20 obtains the original thumbnail data and writes back the data in another area of the RAM 23. When the predetermined number (for example, the number which can be displayed) of thumbnail data is written back in the RAM 23, the controller 20 sequentially reads the thumbnail data from the RAM 23 and transmits the data to the digital signal processing unit 27.

At this time, the controller 20 generates necessary graphics data and transmits the data to the digital signal processing unit 27.

The above data is sequentially processed in the digital signal processing unit 27 and the display processing unit 28, thereby generating a screen signal of a screen (also called as a list screen according to the picture taken date) which displays a list of thumbnails according to the picture taken date. Then, the screen signal is transmitted from the display processing unit 28 to the TP display 8.

Figure 6:
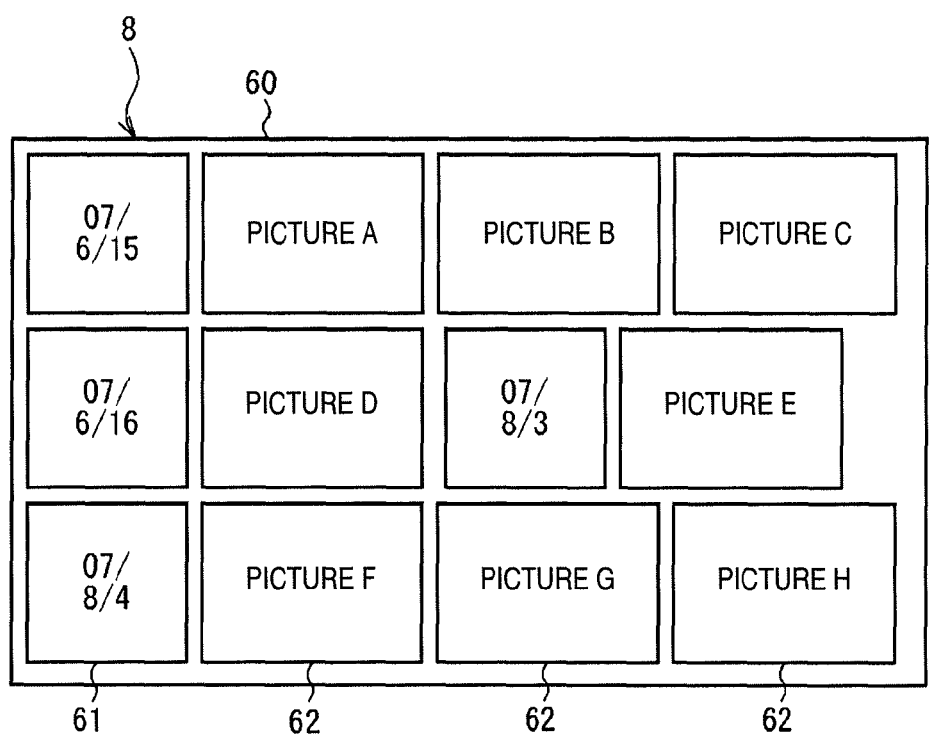
FIG. 6 is a schematic view showing a configuration of a list screen according to a picture taken date.

As a result, a list screen according to the picture taken date 60 is displayed on the TP display 8 as shown in FIG. 6.

Specifically, the list screen according to the picture taken date 60 is divided into plural rows (for example, three rows), and in respective rows, a rectangular frame 61 in which a picture taken date is written and thumbnails 62 of pictures taken at the picture taken date written in the frame 61 are displayed in a manner in which thumbnails 62 are aligned at the right side of the frame 61. In the list screen according to the picture taken date 60 shown in FIG. 6, the display is performed in a manner such that the frame 61, the thumbnail 62, the frame 61 and the thumbnail 62 are aligned from the left in one row, thereby displaying thumbnails belonging to two different picture taken dates in one row at maximum.

Also in the list screen according to the picture taken date 60, thumbnails 62 of other picture taken dates which are difficult to be displayed at a time can be displayed in sequence by scrolling the frames 61 and the thumbnails 62 in a given direction in response to a predetermined touch operation.

Here, assume that a touch operation of selecting one of the thumbnails 62 displayed in the list screen according to the picture taken date 60 is performed by the user. Then, the controller 20 extracts compressed still picture data from the still picture file including the selected thumbnail 62, and plays back the data.

As a result, as shown in FIG. 5, the still picture 50 corresponding to the selected thumbnail 62 is displayed all over the display surface of the TP display 8.

As described above, the digital still camera 1 displays taken pictures according to the picture taken date.

Further, assume that a touch operation of displaying pictures to which a desired label is added is performed by the user. Then, the controller 20 extracts management information having a label name designated by the user from the picture management database Pd, sequentially reads still picture files corresponding to respective extracted management information from the recording medium 30 and stores them in a prescribed area of the RAM 23.

The controller 20 extracts compressed thumbnail data from the still picture files and expands the compressed thumbnail data in the compression/expansion format which is the same as the format used at the time of compression.

As a result, the controller 20 obtains the original thumbnail data, writing back the data in another area of the RAM 23. When the predetermined number of (for example, the number which can be displayed) of thumbnail data is written back in the RAM 23, the controller 20 sequentially reads the thumbnail data from the RAM 23 and transmits the data to the digital signal processing unit 27.

The controller 20 generates necessary graphics data and transmits the data to the digital signal processing unit 27.

The above data is sequentially processed in the digital signal processing unit 27 and the display processing unit 28, thereby generating a screen signal of a screen (also called as a list screen according to the label) which displays a list of thumbnails according to the label. Then, the screen signal is transmitted from the display processing unit 28 to the TP display 8.

Figure 7:
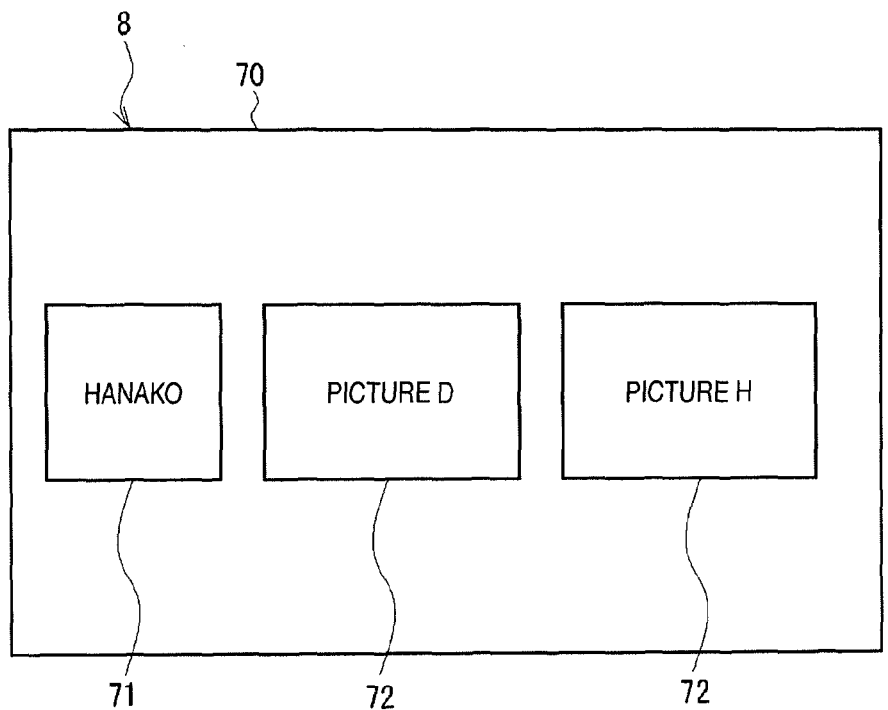
FIG. 7 is a schematic view showing a configuration of a list screen according to a label.

As a result, a list screen according to the label 70 is displayed on the TP display 8 as shown in FIG. 7.

Specifically, in the list screen according to the label 70, a label name is written in a rectangular frame 71 displayed at the left end, and thumbnails 72 of pictures to which the label having the label name written in the frame 71 is added are displayed in a list in positions other than the frame 71.

In the list screen according to the label 70, other thumbnails 72 which are difficult to be displayed at a time can be displayed in sequence by scrolling the thumbnails 72 in a given direction in response to a predetermined touch operation.

Here, assume that a predetermined touch operation of selecting one of the thumbnails 72 displayed in the list screen according to the label 70 is performed by the user. Then, the controller 20 extracts compressed still picture data from the still picture file in which the selected thumbnail 72 is included, and plays back the data.

As a result, the still picture 50 corresponding to the selected thumbnail 72 is displayed all over the display surface of the TP display 8 as shown in FIG. 5.

As described above, the digital still camera 1 searches recorded pictures to which an arbitrary label is added from recorded pictures and displays them.

Additionally, when an external device is connected through the interface terminal 10, the digital still camera 1 transmits and receives picture data with respect to the external device if necessary under control of the controller 20.

The digital still camera 1 not only adds a label selected by the user from the labels registered in advance to pictures but also detects a character string from an imaged picture and adds a label including the character string to the recorded picture. Here, a character recognition engine 32 has a function of detecting the character string from the imaged picture. The addition of the label by the digital still camera 1 will be explained in detail below.

1-3 Addition of Label

Figure 8:
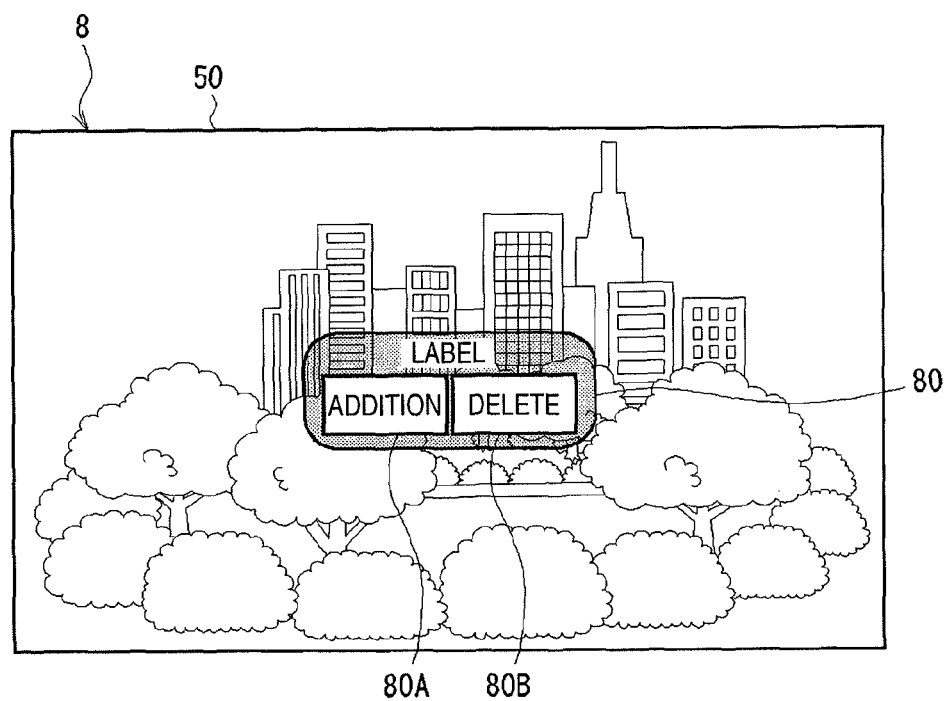
FIG. 8 is a schematic view showing a configuration of a label addition/delete window.

First, assume that a predetermined touch operation of adding the label is performed in the state in which an arbitrary still picture (namely, the recorded picture) is displayed on the TP display 8 as shown in FIG. 5. Then, the controller 20 controls the digital signal processing unit 27 to display a label addition/delete window 80 so as to be superimposed on a prescribed position (for example, at the center) of the recorded picture 50 as shown in FIG. 8.

The label addition/delete window 80 is a window for selecting whether a label is added to the recorded picture 50 during display or a label which has been added (also called as an added label) is deleted from the recorded picture 50 during display.

In the label addition/delete window 80, an addition button 80A for selecting the label addition and a delete button 80B for selecting the deletion of an added label are displayed.

Here, assume that a predetermined touch operation of pressing the delete button 80B of the label addition/delete window 80 is performed. Then, the controller 20 writes "null" in the label name of management information corresponding to the recorded picture 50 during display, which is registered in the picture management database Pd, thereby deleting the added label from the recorded picture 50 during display.

Figure 9:
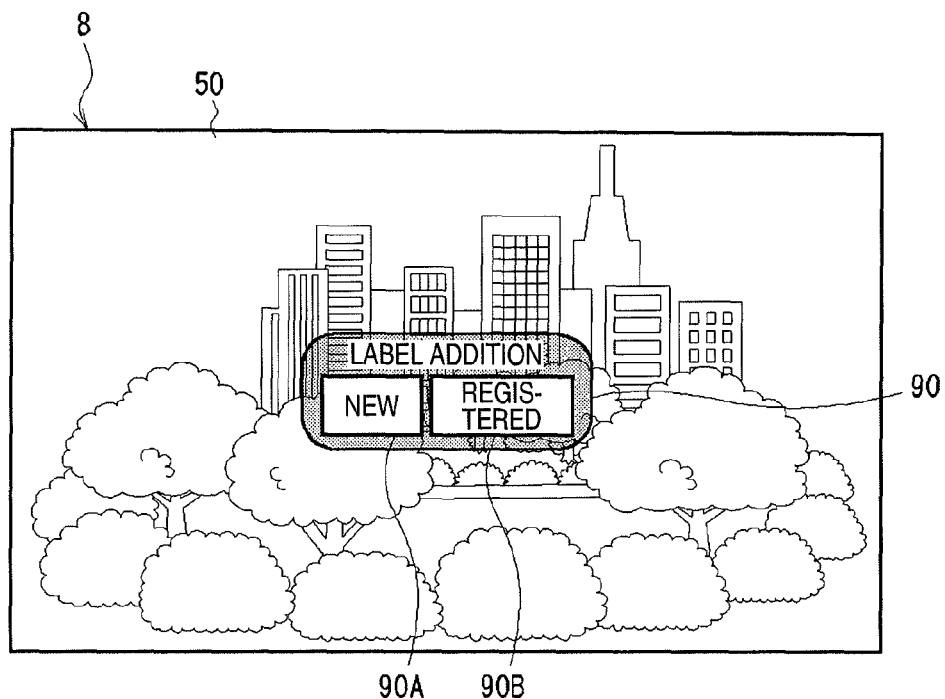
FIG. 9 is a schematic view showing a configuration of a new/registered label addition window.

On the other hand, assume that a predetermined touch operation of pressing the addition button 80A of the label addition/delete window 80 is performed. Then, the controller 20 controls the digital signal processing unit 27 to display a new/registered label addition window 90 instead of the label addition/delete window 80 as shown in FIG. 9.

The new/registered label addition window 90 is a window for selecting whether a new label (also called as a new label) is added to the recorded picture 50 during display or a label which has been registered (also called as a registered label) is added. The registered label indicates labels which are registered in the digital still camera 1 in advance and labels which have been registered as new ones before.

In the new/registered label addition window 90, a new button 90A for selecting the addition of a new label and a registered button 90B for selecting the addition of a registered label are displayed.

Figure 10:
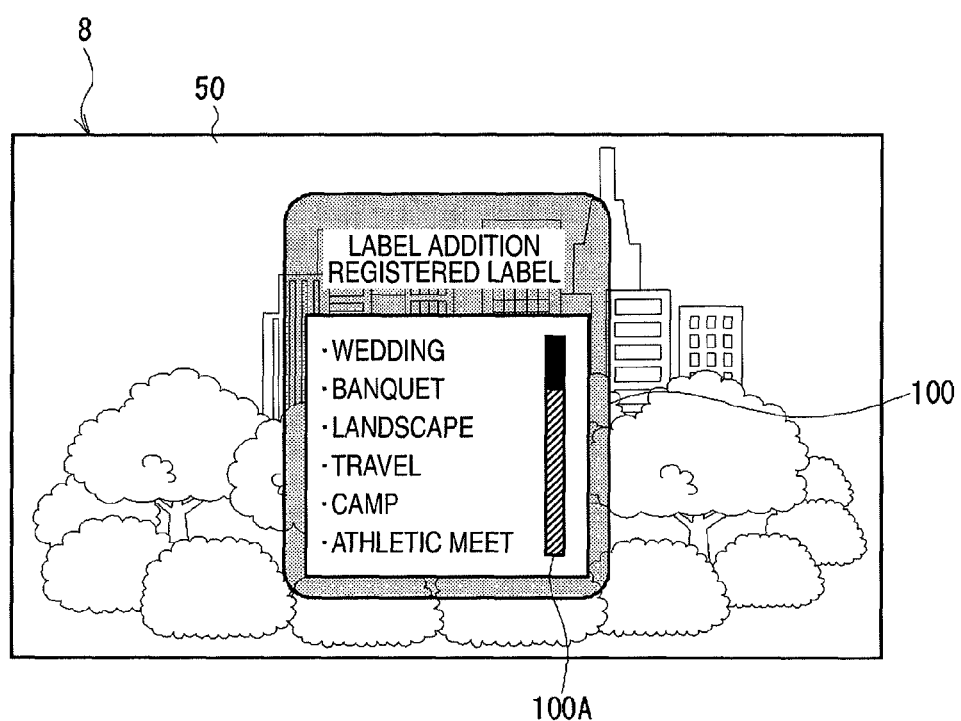
FIG. 10 is a schematic view showing a configuration of a registered label addition window.

Here, assume that a predetermined touch operation of pressing the registered button 90B of the new/registered label addition window 90 is performed. Then, the controller 20 controls the digital signal processing unit 27 to display a registered label addition window 100 instead of the new/registered label addition window 90 as shown in FIG. 10.

The registered label addition window 100 is a window for selecting a label to be added to the recorded picture 50 during display from the registered labels.

In the registered label addition window 100, label names as registered labels (for example, "wedding", "banquet" and the like) are displayed in a list. The registered labels are registered in a registered label database (not shown) built in the flash memory 22. That is, the controller 20 obtains registered labels from the registered label database and displays the label in the registered label addition window 100.

Also in the registered label addition window 100, registered labels which are difficult to be displayed at a time can be displayed in sequence by scrolling the registered labels in a given direction in response to a touch operation to a scroll bar 100A arranged in a prescribed position of the window.

Here, assume that a predetermined touch operation of selecting a label to be added to the recorded picture 50 during display from the registered labels displayed in the list on the registered label addition window 100 is performed. Then, the controller 20 writes a label name of the selected registered label in the label name of management information corresponding to the recorded picture 50 during display, which is registered in the picture management database Pd, thereby adding the registered label to the recorded picture 50 during display.

Figure 11:
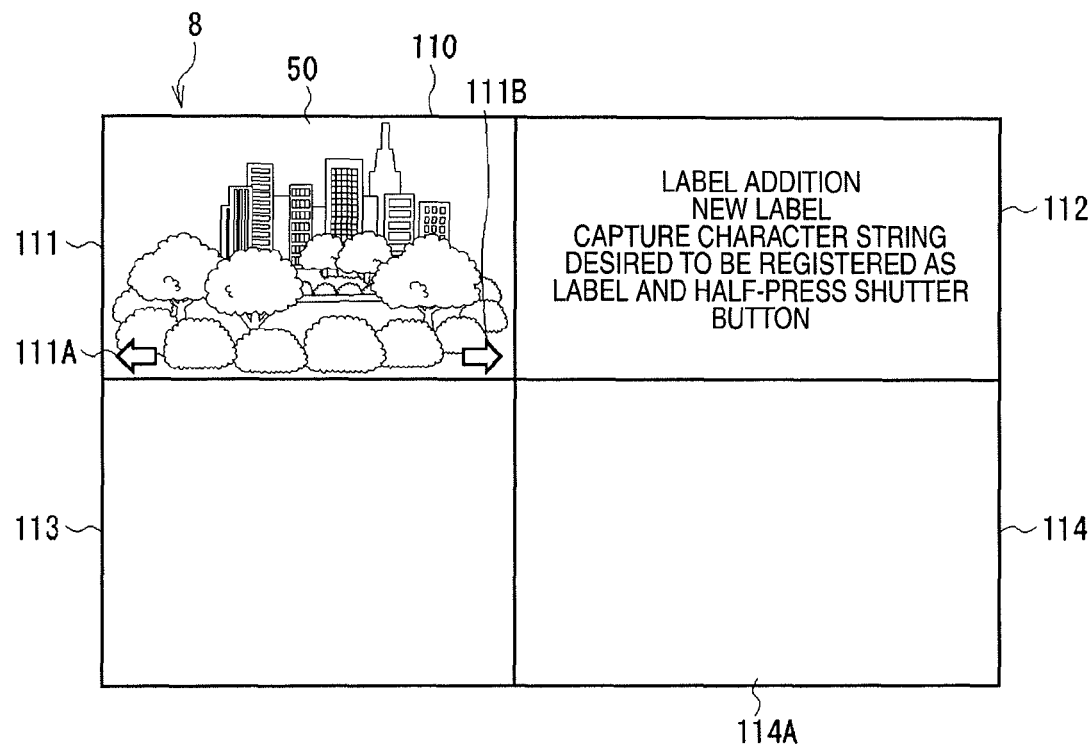
FIG. 11 is a schematic view showing a configuration 1 of a new label addition screen.

On the other hand, assume that a predetermined touch operation of pressing the new button 90A of the new/registered label addition window 90 shown in FIG. 9 is performed. Then, the controller 20 controls the digital signal processing unit 27 to display a new label addition screen 110 on the TP display 8 instead of the still picture 50 and the new/registered label addition window 90 as shown in FIG. 11.

The new label addition screen 110 is a screen for detecting a character string (character information including one or more characters) to be a label from the imaged picture and adding the label including the character string as a new label to an arbitrary recording picture.

The new label addition screen 110 is divided into four areas 111, 112, 113 and 114 of vertical 2×horizontal 2. That is, the screen includes an upper left area 111, an upper right area 112, a lower left area 113 and a lower right area 114.

The controller 20, when switching the display to the new label addition screen 110, displays the recorded picture 50 which has been displayed just before switching the display in the upper left area 111 in a state in which the display size is reduced (approximately ¼).

The controller 20 also displays an arrow button 111A for switching the recorded picture 50 to be displayed in the area 111 to the previous recoded picture at a lower left corner of the area 111. The controller 20 further displays an arrow button 111B for switching the recorded picture 50 to be displayed in the area 111 to the next recorded picture at a lower right corner of the area 111.

The recorded pictures displayed in the area 111 are aligned from the oldest picture taken date based on the picture management database Pd. Therefore, the next recorded picture indicates a recorded picture whose picture taken date is newer than the recorded picture during display, and the previous recorded picture indicates a recorded picture whose picture taken date is older than the recorded picture during display.

The controller 20 further displays an imaged picture 114A captured through the imaging device 25 at the lower right area 114 in real time.

Moreover, the controller 20 displays character information at the upper right area 112, which instructs the user to capture a character string desired to be added to the recorded picture as a label in the area 114 and to half-press the shutter button 7 (for example, capture a character string desired to be registered as a label and half-press the shutter button").

For example, assume that the camera lens portion 3 of the digital still camera 1 is pointed at a subject on which a character string desired to be added to the recorded picture as a label is written (for example, a station nameboard on which a station name is written).

Figure 12:
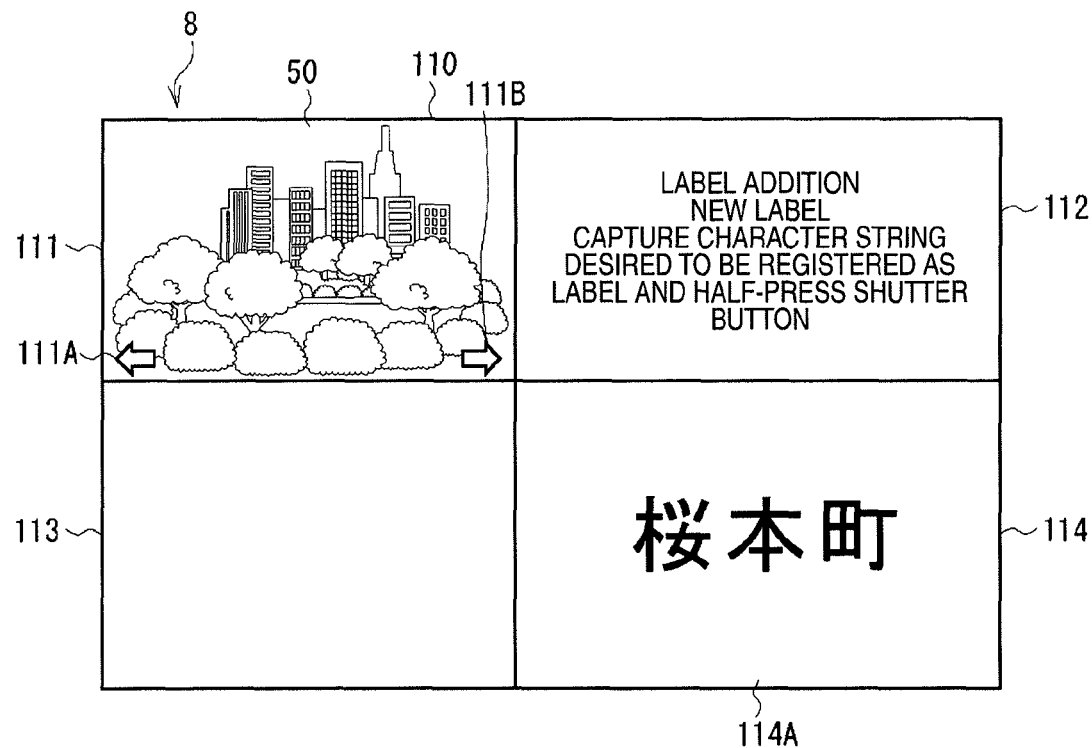
FIG. 12 is a schematic view showing a configuration 2 of the new label addition screen.

Then, the imaged picture 114A of the subject on which a character string (for example, "桜本町 (sakura-hon-machi)") desired to be added on the recorded picture is written as a label is displayed at the lower right area 114 as shown in FIG. 12.

According to the above, the digital still camera 1 can allow the user to check the recorded picture 50 to be a target of label addition, which is displayed in the area 111 as well as allow the user to check the imaged picture 114A of the subject on which the character string desired to be added to the recorded picture 50 is written, which is displayed at the area 114.

When the shutter button 7 is half-pressed in the above state, the controller 20 detects the character string from the imaged picture (namely, the imaged picture 114A displayed at the area 114) captured through the imaging device 25 by using the character recognition engine 32.

Actually, the controller 20 controls the digital signal processing unit 27 to output the picture data of the imaged picture captured through the imaging device 25 when the shutter button 7 is half-pressed.

Then, the controller 20 transmits the picture data outputted from the digital signal processing unit 27 to the character recognition engine 32. The character recognition engine 32 performs detection of the character string with respect to the transmitted picture data based on a prescribed character string detection algorithm. As a result, when the character string is detected from the picture based on the picture data, the character recognition engine 32 sequentially transmits character codes of characters included in the character string to the controller 20.

The controller 20 generates graphics data of the character string detected by the character recognition engine 32 (also called as a detected character string) by rendering the character font based on the transmitted character codes. The graphics data is stored in a prescribed area of the RAM 23 by the controller 20, then, read from the RAM 23 and transmitted to the digital signal processing unit 27.

Figure 13:
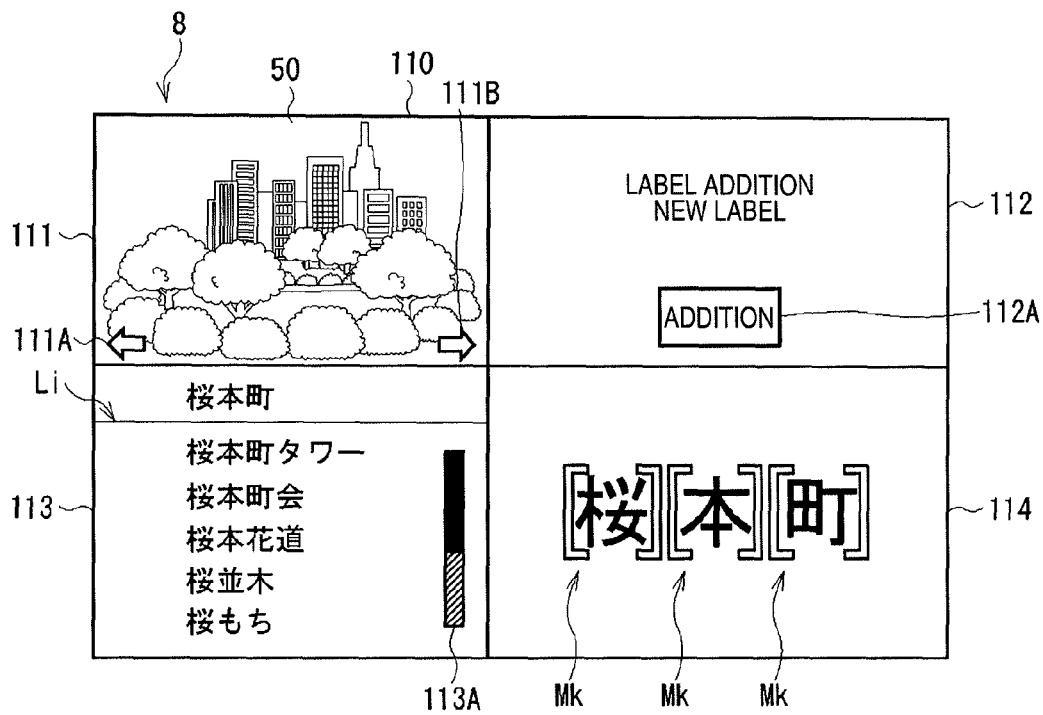
FIG. 13 is a schematic view showing a configuration 3 of the new label addition screen.
Figure 14:
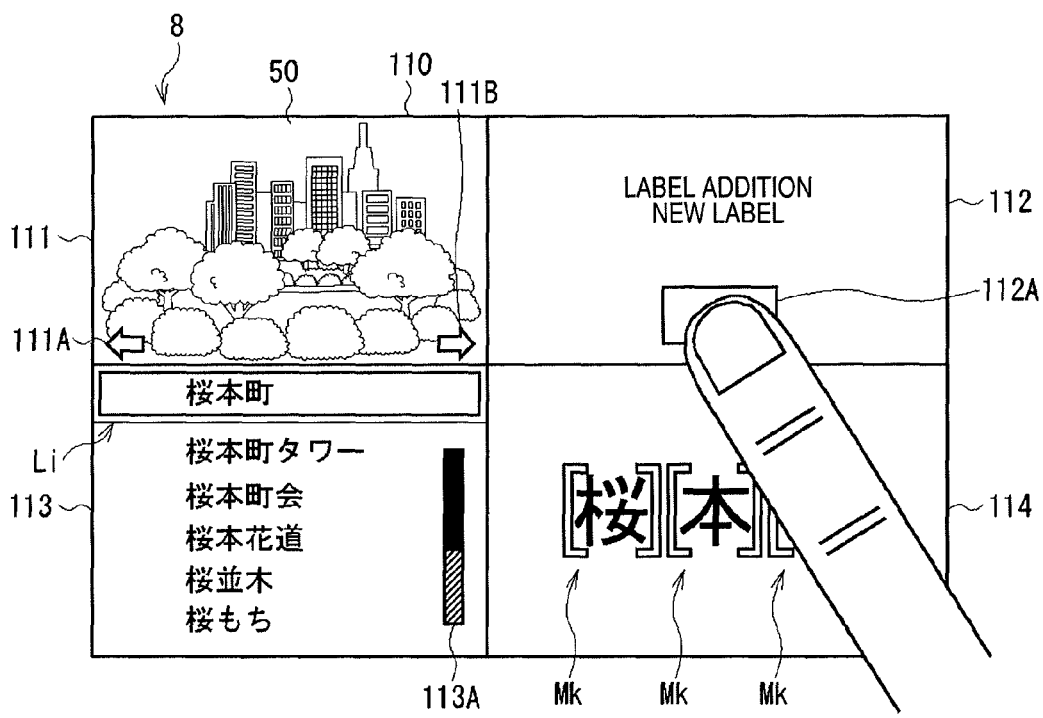
FIG. 14 is a schematic view showing a configuration 4 of the new label addition screen.

As a result, as shown in FIG. 13, the detected character string based on the graphics data, namely, the character string (for example, "桜本町 (sakura-hon-machi")) detected from the imaged picture captured by the imaging device 25 is displayed at an upper end of the lower left area 113 of the new label addition screen 110.

At this time, the controller 20 searches registered labels (also called as similar registered labels) which begin with the same character as the first character (for example, "桜 (sakura)") of the detected character strings from the registered label database.

As the result of search, assume that similar registered labels (for example, "桜本町タワー (sakura-hon-machi-tower" and the like) have been found. Then, the controller 20 displays the similar registered labels (actually, label names) in a list below the detected character string displayed at the upper end of the left area 113.

Note that a boundary line Li is drawn between the character string detected from the imaged picture and the similar registered labels displayed below. According to this, the digital still camera 1 allows the user to discriminate the detected character string from the similar registered label easily.

When plural similar registered labels are found, the controller 20 displays them in a list from the highest similarity. Moreover, similar registered labels which are not displayed at a time can be displayed at the area 113 in sequence by scrolling the similar registered labels in a given direction in response to a touch operation with respect to a scroll bar 113A arranged at a prescribed position.

As described above, the detected character string detected from the imaged picture (namely, the imaged picture 114A displayed at the area 114) captured through the imaging device 25 and similar registered labels including at least the first character of the detected character string are displayed at the area 113. The detected character string and the similar registered labels displayed at the area 113 will be candidates for a label (called as candidate labels) to be added to the recorded picture 50 displayed at the area 111.

The candidate labels are kept on being displayed at the area 113 until the shutter button 7 is half-pressed again.

Also at this time, the character recognition engine 32 transmits character detection position information to the controller 20, which indicates from which positions of the imaged picture respective characters have been detected.

The controller 20 generates graphics data based on the transmitted character detection position information. The graphics data is stored in a prescribed area of the RAM 23, then, read from the RAM 23 and transmitted to the digital signal processing unit 27 by the controller 20.

As a result, markers Mk indicating from which portions of the imaged picture 114A respective characters have been detected are displayed superimposed on the imaged picture 114A at the lower right area 114. The markers Mk are displayed only when, for example, the shutter button 7 is half-pressed.

Further, at this time, the controller 20 displays an addition button 112A in the upper right area 112, which is for adding a label selected from the candidate labels displayed at the area 113 to the recorded picture 50 displayed at the area 111.

Here, assume that a predetermined touch operation of selecting an arbitrary label from the candidate labels displayed at the area 113 and pressing the addition button 112A displayed at the area 112 is performed. Then, the controller 20 adds a label to the recorded picture 50 during display by writing a label name of the selected label in the label name of management information corresponding to the recorded picture 50 during display, which is registered in the picture management database Pd.

When the selected label is a new label detected from the imaged picture (namely, a label not registered in the registered label database), the controller 20 registers the label anew in the registered label database. As a result, the label can be used as the registered label from that time.

Figure 15:
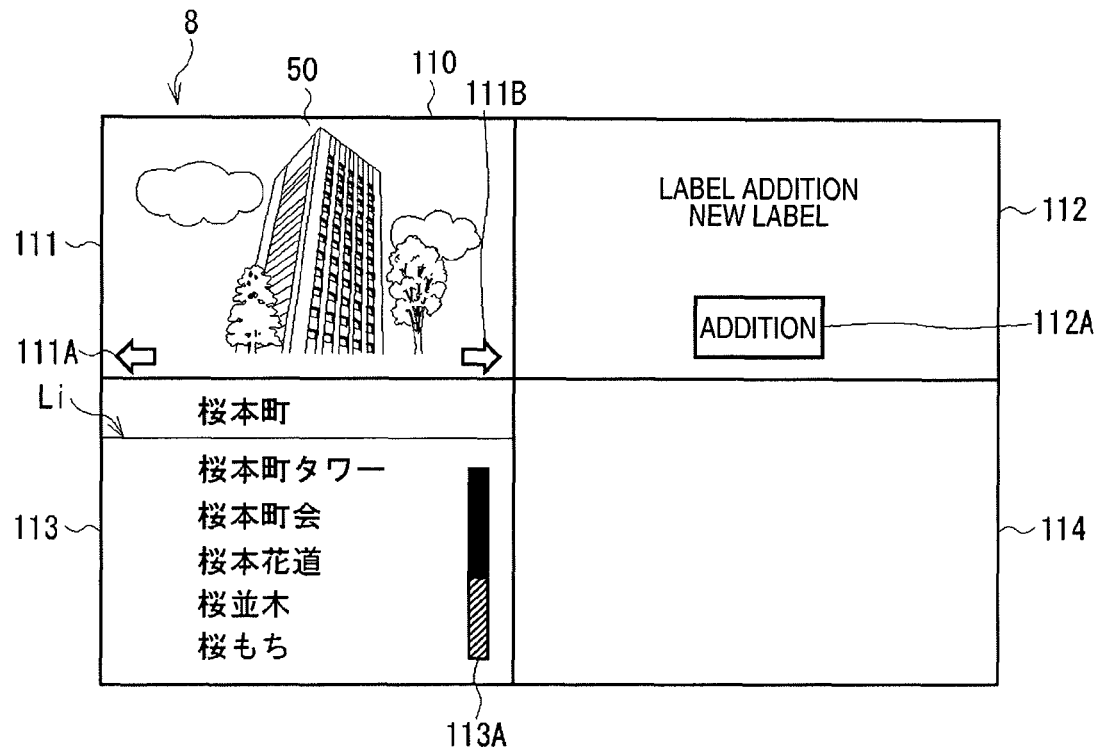
FIG. 15 is a schematic view showing a configuration 5 of the new label addition screen.

Here, assume that a predetermined touch operation of pressing the arrow button 111A or the 111B displayed at the area 111 is performed. Then, the controller 20 switches the recorded picture 50 to be displayed at the area 111 to the previous or next recorded picture as shown in FIG. 15.

Additionally, assume that a predetermined touch operation of selecting an arbitrary label from the candidate labels which are kept on being displayed at the area 113 and pressing the addition button 112A displayed at the area 112 is performed. Then, the controller 20 adds a label to the recorded picture 50 during display by writing a label name of the selected label in the label name of management information corresponding to the recorded picture 50 during display, which is registered in the picture management database Pd.

According to the above, the digital still camera 1 can add labels selected from the candidate labels which are kept on being displayed at the area 113 to plural recorded pictures continuously.

When the shutter button 7 is half-pressed again after it is once released, the controller 20 detects a character string again from an imaged picture captured at that time through the imaging device 25 by using the character recognition engine 32. The controller 20 updates candidate labels displayed at the area 113 by the newly detected character string and similar registered labels with respect to the detected character string.

As described above, the digital still camera 1 can perform detection of character strings repeatedly by simple operation of just repeating the half-pressing of the shutter button 7.

According to this, it is possible that the digital still camera 1 cancels the detected character string and detects another character string, or performs detection of the character strings again easily.

Figure 16:
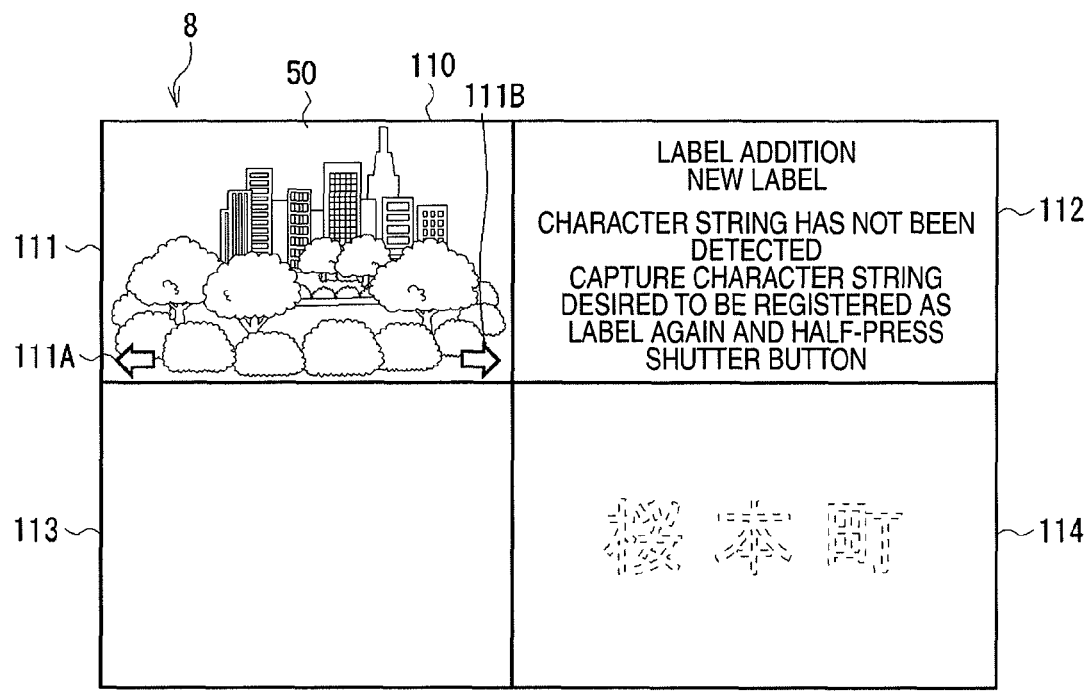
FIG. 16 is a schematic view showing a configuration 6 of the new label addition screen.

On the other hand, in the case that the character string has not been detected from the imaged picture by some kind of reason, the character recognition engine 32 returns an error to the controller 20. Then, the controller 20 displays character information indicating that the character string has not been detected (for example, "Character string has not been detected") at the upper right area 112 as shown in FIG. 16.

Accordingly, when the character string has not been detected, the digital still camera 1 informs the user of that.

At this time, the controller 20 also displays character information of instructing the user to capture the character string desired to be added to the recorded picture as a label at the area 114 and to half-press the shutter button 7 again (for example, "Capture the character string desired to be registered as a label and half-press the shutter button again").

Accordingly, when the character string has not been detected, the digital still camera 1 prompts the user to capture the character string desired to be added to the recorded picture as a label at the area 114 and half-press the shutter button 7 again.

As explained above, the digital still camera 1 not only adds the label registered in advance to the recorded picture but also detects the character string from the imaged picture and adds the label including the character string to the recorded picture.

According to this, the digital still camera 1 can add the label including the character string desired by the user to the recorded picture though it does not have a character input means such as a keyboard.

In the digital still camera 1, the recorded picture 50 which is the target of label addition and the imaged picture 114A of the subject on which the character string to be added to the recorded picture 50 as a label is written are simultaneously displayed on the new label addition screen 110.

According to the above, the digital still camera 1 is capable of adding the label including the character string to the recorded picture 50, while allowing the user to check the recorded picture 50 to be the target of label addition as well as to check the character string to be added to the recorded picture 50 as a label.

Moreover, the digital still camera 1 displays not only the character string detected from the imaged picture but also the registered labels including at least the first character of the character string, which are searched from the registered label database as candidates for the label to be added to the recorded picture 50.

According to the above, the digital still camera 1 is capable of presenting registered labels as candidates for the label to be added to the recorded picture 50 when there exist registered labels similar to the detected character string. According to the presentation, it is possible to inform the user that the similar label has been already registered, as a result, it is possible to avoid that plural similar labels are registered unnecessarily.

Furthermore, in the above case, when the user searches a desired registered label, the subject on which the character string used as a search condition is written is allowed to be captured by the digital still camera 1, thereby searching a desired registered label rapidly even when many registered labels are registered.

In the above description, the case of adding labels to still pictures has been explained, however, it is possible to add labels to moving pictures in the same manner as the case of the addition to the still pictures.

1-4 Label Addition Processing Procedure

Figure 17:
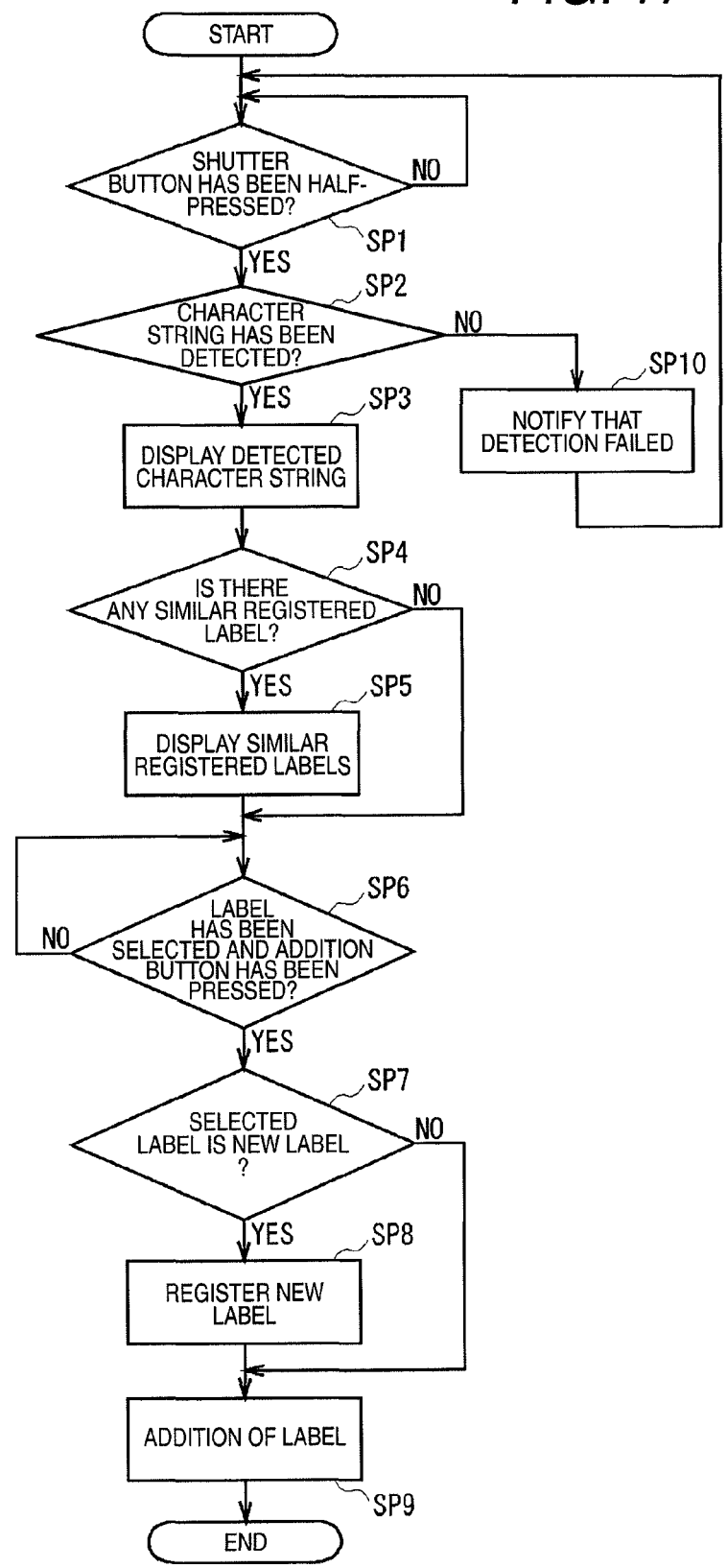
FIG. 17 is a flowchart showing a label addition processing procedure.

Next, a series of processing procedure (called as a label addition processing procedure) from the detection of a character string to be a label from an imaging picture to the addition of the label will be explained in detail with reference to FIG. 17. The label addition processing procedure is a procedure executed by the controller 20 of the digital still camera 1 in accordance with a program installed in the flash memory 22.

The controller 20, after switching the display to the new label addition screen 110, starts a label addition processing procedure RT and proceeds to Step SP1. In Step SP1, the controller 20 waits for the shutter button 7 to be pressed while displaying a recorded picture at the area 111 of the new label addition screen 110 as well as displaying an imaged picture at the area 114. The controller 20 obtains an affirmative result when recognizing that the shutter button 7 has been pressed, then, proceeds to Step SP2.

In Step S2, the controller 20 determines whether the character recognition engine 32 has detected a character string from the imaged picture captured through the imaging device 25 at that time.

When an affirmative result is obtained in Step SP2, this means that the character string could have been detected from the imaging picture by the character recognition engine 32, then, the controller 20 proceeds to Step SP3.

In Step SP3, the controller 20 displays the character string which has been detected (detected character string) as a candidate label at the lower left area 113 of the new label addition screen 110, proceeding to the next Step SP4. In Step SP4, the controller 20 determines whether a similar registered label including at least the first character of the detected character string is registered in the registered label database.

When an affirmative result is obtained in Step SP4, this means that the similar registered label is registered in the registered label database, and the controller 20 proceeds to Step SP5.

In Step SP5, the controller 20 displays registered labels found from the registered label database at the area 113 as candidates labels, proceeding to the next Step SP6. When a negative result is obtained at the above Step SP4, namely, when any similar registered label is not registered in the registered label database, the controller 20 skips the Step SP5 and proceeds to Step SP6.

In Step SP6, the controller 20 waits until an arbitrary label is selected from the candidate labels displayed at the area 113 and the addition button 112A displayed at the area 112 is pressed.

Here, when the arbitrary label is selected from candidate labels displayed at the area 113 and the addition button 112A displayed at the area 112 is pressed, the controller 20 obtains an affirmative result in the Step SP6, proceeding to Step SP7.

In Step SP7, the controller 20 determines whether the selected label is a new label not registered in the registered label database. When an affirmative result is obtained in Step SP7, this means that the selected label is the new label detected from the imaged picture, and the controller 20 proceeds to Step SP8.

In Step SP8, the controller 20 registers the new label in the registered label database, proceeding to the next Step SP9. When a negative result is obtained in the above Step SP7, namely, when the selected label is not the new label and is the registered label, the controller 20 skips the Step SP8 and proceeds to Step SP9.

In Step SP9, the controller 20 writes a label name of the selected label in the label name of management information corresponding to the recorded picture during display at the area 111, which is registered in the picture management database Pd, thereby adding the label to the recorded picture, and the label addition processing procedure RT1 ends.

When a negative result is obtained at the above Step SP2, namely, when the character recognition engine 32 has not detected the character string from the imaged picture, the controller 20 proceeds to Step SP10.

In Step SP10, the controller 20 displays character information indicating that the character string has not been detected from the imaged picture at the area 112, thereby notifying the user the fact. After that, the controller 20 returns to Step SP1 again, waiting for the shutter button 7 to be half-pressed.

In accordance with the label addition processing procedure RT1, the controller 20 adds a label by detecting a character string to be the label from the imaged picture.

(1-5) Operations and Advantages in the First Embodiment

In the above configuration, the digital still camera 1 displays the new label addition screen 110 on the TP display 8 in response to a predetermined touch operation. The new label addition screen 110 is divided into four areas 111, 112, 113 and 114.

The digital still camera 1 displays a recorded picture to be a target of label addition at the area 111 as one of these areas. At the same time, the digital still camera 1 displays the imaged picture captured through the imaging device 25 at the area 114.

Here, when the camera lens portion 3 of the digital still camera 1 is pointed to the subject on which the character string desired to be added as a label is written, the imaged picture of the subject on which the character string desired to be added as a label is written is displayed at the area 114.

As a result, the digital still camera 1 allows the user to check the recorded picture to be the target of label addition and the imaged picture of the subject on which the character string desired to be added to the recorded picture as a label is written on one screen at the same time.

When the shutter button 7 is half-pressed by the user who recognized these pictures, the digital still camera 1 detects a character string from the imaged picture captured through the imaging device 25 at that time, displaying the character string at the area 113 as a candidate for the label to be added to the recorded picture.

Here, assume that a predetermined touch operation of adding the character string to the recorded picture displayed as a label at the area 111 is performed. Then, the digital still camera 1 adds the label to the recorded picture by writing a label name of the selected label in management information of the recorded picture displayed at the area 111.

As described above, the digital still camera 1 can add the label including the character string to the recorded picture while allowing the user to check the recorded picture to be the target of label addition as well as allowing the user to check the imaged picture on which the character string to be added to the recorded picture as a label is written. In other words, the digital still camera 1 can allow the user to check the recorded picture as well as to check the imaged picture on which the character string which is desired to be added as a label is written easily without switching the screen.

The digital still camera 1 also displays not only the detected character string but also registered labels (similar registered labels) which begin with the same character as the first character of the character string at the area 113 as candidates for the label to be added to the recorded picture.

According to the above, the digital still camera 1 can add not only the character string detected from the imaged picture but also registered labels including at least part of the character string to the recorded picture.

Moreover, the digital still camera 1, when adding the label selected from the candidates displayed at the area 113 to the recorded picture, registers the label to the registered label database built in the flash memory 22 only when the label is an unregistered label.

Accordingly, the digital still camera 1 can avoid that duplicate labels are registered, as a result, the capacity of the flash memory 22 can be efficiently used.

According to the above configuration, the digital still camera 1 displays the recorded picture and the imaged picture captured through the imaging device 25 on the same screen, adding the character string detected from the imaged picture by the character recognition engine 32 to the recorded picture displayed on the same screen as a label, thereby adding the character string detected from the imaged picture to the recorded picture as a label while allowing the user to check the recorded picture to be the target of label addition as well as to check the imaged picture to be the target of character string detection. Accordingly, the digital still camera 1 is capable of adding the label to the recorded picture more easily as compared with the case in which the check of the recorded picture and the check of the imaged picture are performed at different screens.

2. Second Embodiment

Next, a second embodiment will be explained. In the above first embodiment, the digital still camera 1 detects a character string from an imaged picture of a subject on which the character string is written, adding the character string to a recorded picture as a label. Correspondingly, in the second embodiment, the digital still camera 1 reads a two-dimensional code from an imaged picture of a subject on which the two-dimensional code is written, and adds a character string obtained as the result to the recorded picture as a label.

Figure 18:
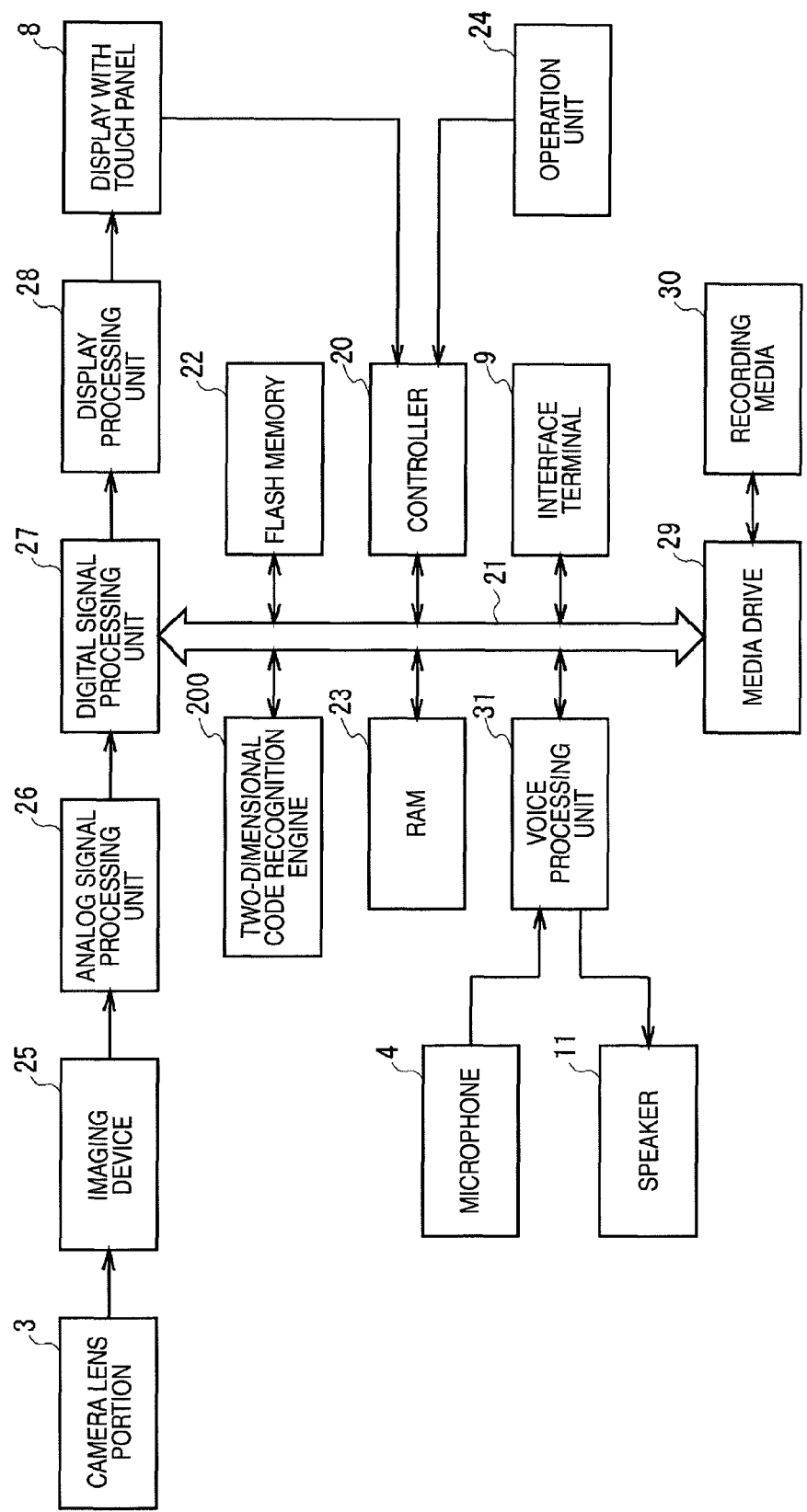
FIG. 18 is a schematic diagram showing an internal configuration of a digital still camera according to a second embodiment.

Accordingly, in the digital still camera 1 of the second embodiment, a two-dimensional code recognition engine 200 is provided instead of the character recognition engine 32 as shown in FIG. 18. The configuration other than the two-dimensional code recognition engine 200 and configurations of respective screens are basically the same as the first embodiment.

Therefore, operations from the reading of a two-dimensional code from the imaged picture until the detection of the character string will be mainly explained here.

(2-1) Detection of Character String from Two-Dimensional Code

First, the controller 20 displays the new label addition screen 110 on the TP display 8 in the same manner as the first embodiment.

At this time, the controller 20 displays the recorded picture 50, the arrow buttons 111A and 111B at the upper left area 111 and displays the imaging picture 114A captured through the imaging device 25 at the lower right area 114 in real time.

The controller 20 displays character information (not shown) at the upper right area 112a, which instructs the user to capture a two-dimensional code in which a character string to be a label is stored at the area 114 and half-press the shutter button 7 (for example, "capture a two-dimensional code and half-press the shutter button).

Here, assume that, for example, the camera lens portion 3 of the digital still camera 1 is pointed to a subject (for example, an information magazine) in which a two-dimensional code storing a character string desired to be added as a label is written by the user.

Figure 19:
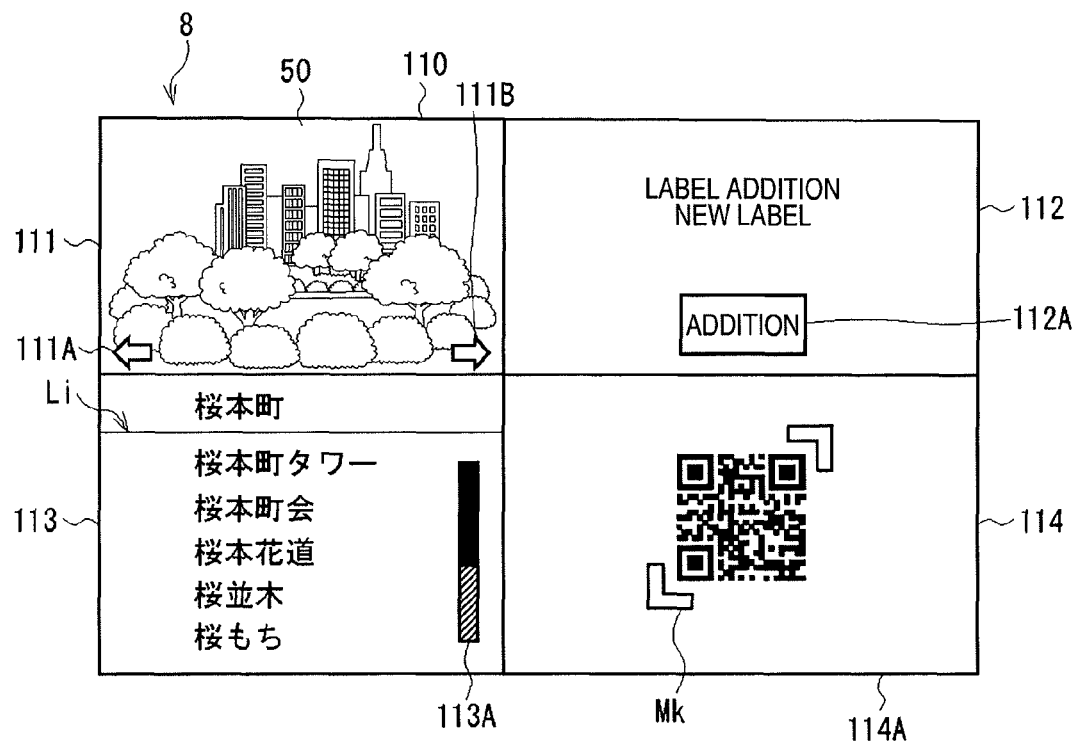
FIG. 19 is a schematic view showing a configuration 1 of the new label addition screen according to the second embodiment.

Then, the imaged picture 114A of the subject in which the two-dimensional code is written is displayed at the lower right area 114 as shown in FIG. 19.

When the shutter button 7 is half-pressed in this state, the controller 20 reads the two-dimensional code from the imaged picture (namely, the imaged picture 114A displayed at the area 114 at that time) captured through the imaging device 25 at that time by using the two-dimensional code recognition engine 200.

Actually, when the shutter button 7 is half-pressed, the controller 20 controls the digital signal processing unit 27 to output picture data of the imaged picture captured through the imaging device 25 at that time.

Then, the controller 20 transmits picture data outputted from the digital signal processing unit 27 to the two-dimensional code recognition engine 200. The two-dimensional code recognition engine 200 reads a two-dimensional code from the imaged picture based on the transmitted picture data. Here, when the two-dimensional code can be read from the imaged picture based on the picture data, the two-dimensional code recognition engine 200 obtains a character string included in the two-dimensional code as the result of the reading, transmitting character codes of characters included in the character string to the controller 20 in sequence.

The controller 20 renders a character font based on the transmitted character codes, thereby generating graphics data of the character string detected from the two-dimensional code recognition engine 200. The graphics data is stored in a prescribed area of the RAM 23 by the controller 20, then, read from the RAM 23 and transmitted to the digital signal processing unit 27.

As a result, a character string based on the graphics data, namely, the character string stored in the two-dimensional code read from the imaged picture captured through the imaging device 25 is displayed at an upper end of the area 113 as a candidate for a label added to the recorded picture 50.

When there exist registered labels which begin with the same character as the first character of the character string, the controller 20 also displays these labels at the area 113 as candidates for the label to be added.

Further, at this time, the controller 20 obtains code reading position information indicating from which position of the imaged picture the two-dimensional code has been read using the two-dimensional code recognition engine 200. Then, the controller 20 displays a marker Mk indicating from which position of the imaged picture 114A the two-dimensional code has been read so that the marked Mk is superimposed on the imaged picture 114A at the lower right area 114 based on the code reading position information.

Further, at this time, the controller 20 displays the addition button 112A at the upper right area 112.

Here, assume that a predetermined touch operation of selecting an arbitrary label from the candidates displayed at the area 113 and pressing the addition button 112A displayed at the area 112 is performed. Then, the controller 20 adds a label to the recorded picture 50 during display by writing a label name of the selected label in the label name of management information corresponding to the recorded picture 50 during display, which is registered in the picture management database Pd.

As described above, in the second embodiment, the two-dimensional code is read from the imaged picture of the subject in which the two-dimensional code is written, and the character string obtained as the result of the reading can be added to the recorded picture as a label.

In the two-dimensional code, several hundred to several thousand characters can be stored, though it depends on the type of the code. Therefore, plural character strings which can be labels may be stored in the two-dimensional code.

Here, assume that the two-dimensional code recognition engine 200 actually reads the two-dimensional code storing plural character strings (for example, "桜 本 町 (sakura-hon-machi) " "桜本町駅 (sakura-hon-machi-eki)" and "桜本町公園 (sakura-hon-machi-kouen)") from the imaged picture. Then, the two-dimensional code recognition engine 200 obtains plural character strings stored in the two-dimensional code as the result of the reading, transmitting character codes of characters included in the character string to the controller 20 in sequence.

At this time, the two-dimensional code recognition engine 200 transmits, for example, a character code indicating line feed (called as a line feed code) after the last character of the character string to the controller 20 so that the controller 20 can discriminate the boundary between respective character strings.

The controller 20 generates graphics data of plural character strings detected by the two-dimensional code recognition engine 200 by rendering a character font based on the transmitted character codes and line feed codes. The graphics data is stored in a prescribed area of the RAM 23, read from the RAM 23 and transmitted to the digital signal processing unit 27 by the controller 20.

Figure 20:
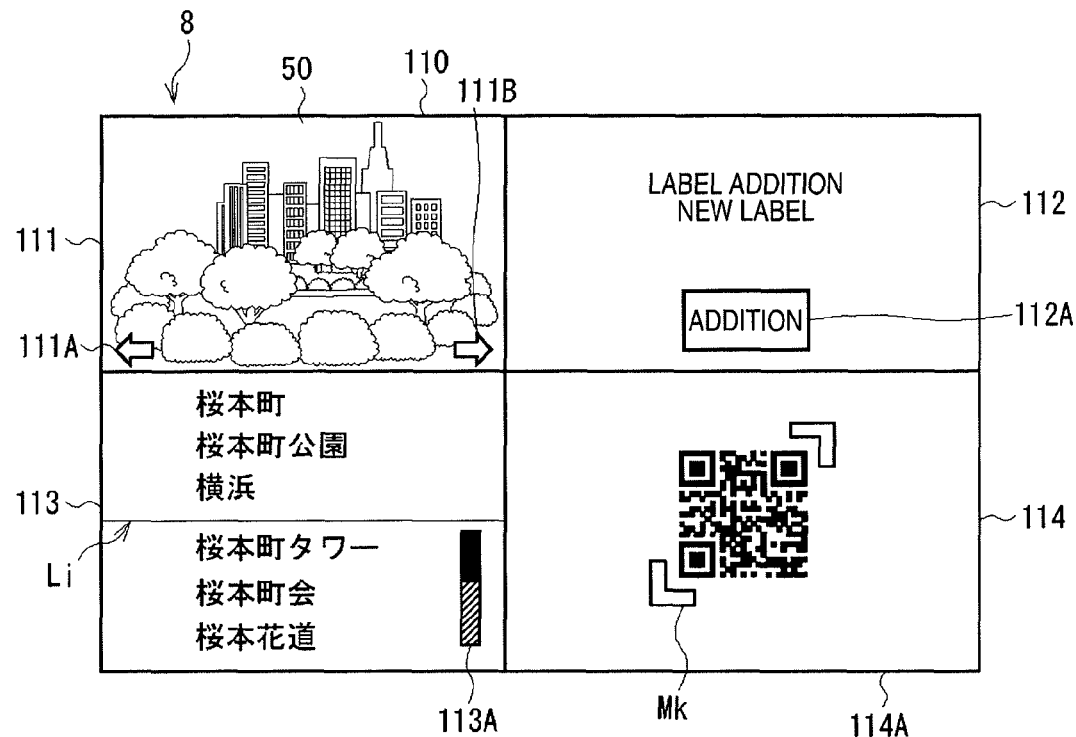
FIG. 20 is a schematic view showing a configuration 2 of the new label addition screen according to the second embodiment.

As a result, plural character strings based on the graphics data, namely, plural character strings stored in the two-dimensional code are displayed in a list at the upper end of the area 113 as candidate labels to be added to the recorded picture 50 as shown in FIG. 20.

Further, at this time, when there exist registered labels which begin with the same character as the first character of these plural character strings, the controller 20 also displays these character strings at the area 113 as candidate labels to be added.

Moreover, in this case, plural labels to be added to the recorded picture can be selected from plural candidate labels displayed at the area 113.

Figure 21:
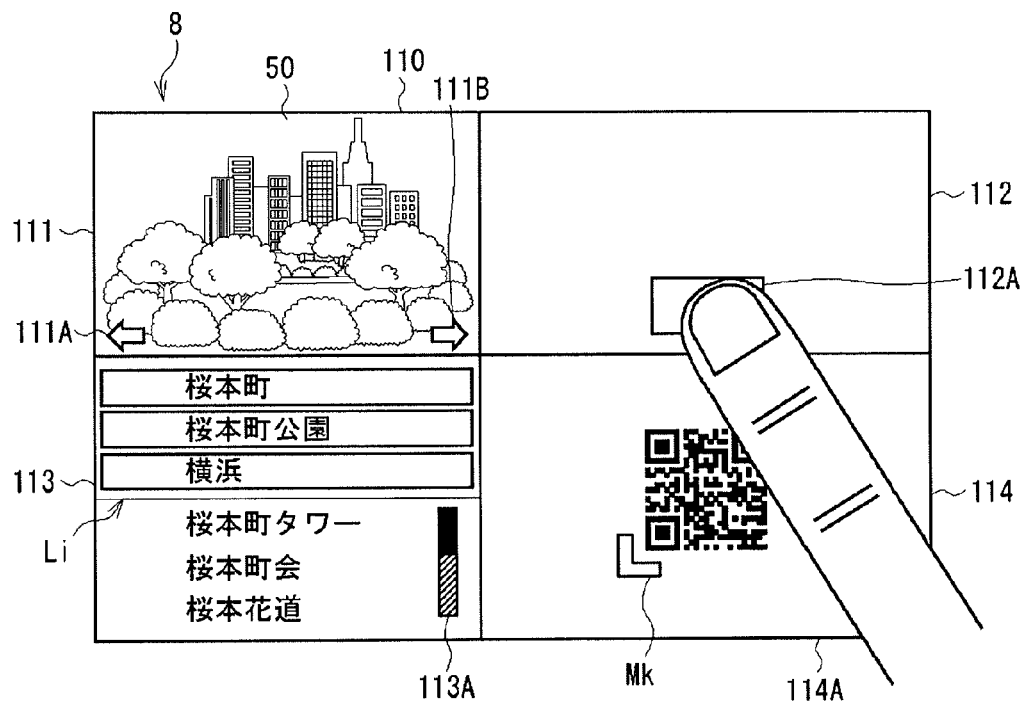
FIG. 21 is a schematic view showing a configuration 3 of the new label addition screen according to the second embodiment.

Assume that a prescribed tough operation of selecting plural labels from plural candidate labels displayed at the area 113 and pressing the addition button 112A displayed at the area 112 is performed as shown in FIG. 21. Then, the controller 20 adds plural labels to the recorded picture 50 during display by writing label names of the selected plural labels in label names of management information corresponding to the recorded picture 50 during display, which are registered in the picture management database Pd.

As described above, the digital still camera 1 according to the second embodiment is capable of detecting plural character strings from the imaged picture at a time by using the two-dimensional code and adding the detected plural character strings to the recorded picture at a time as plural labels.

Accordingly, the digital still camera 1 according to the second embodiment is capable of adding labels more efficiently in a short time in the case that plural labels are added to the recorded picture.

3. Other embodiments

3-1 Embodiment 1 in Other Embodiments

In the above first embodiment, after the shutter button 7 is half-pressed and the character string detected from the imaged picture is displayed at the area 113, when the shutter button 7 is half-pressed again, the character string detected at the previous time is deleted and a character string newly detected is displayed at the area 113.

Figure 22:
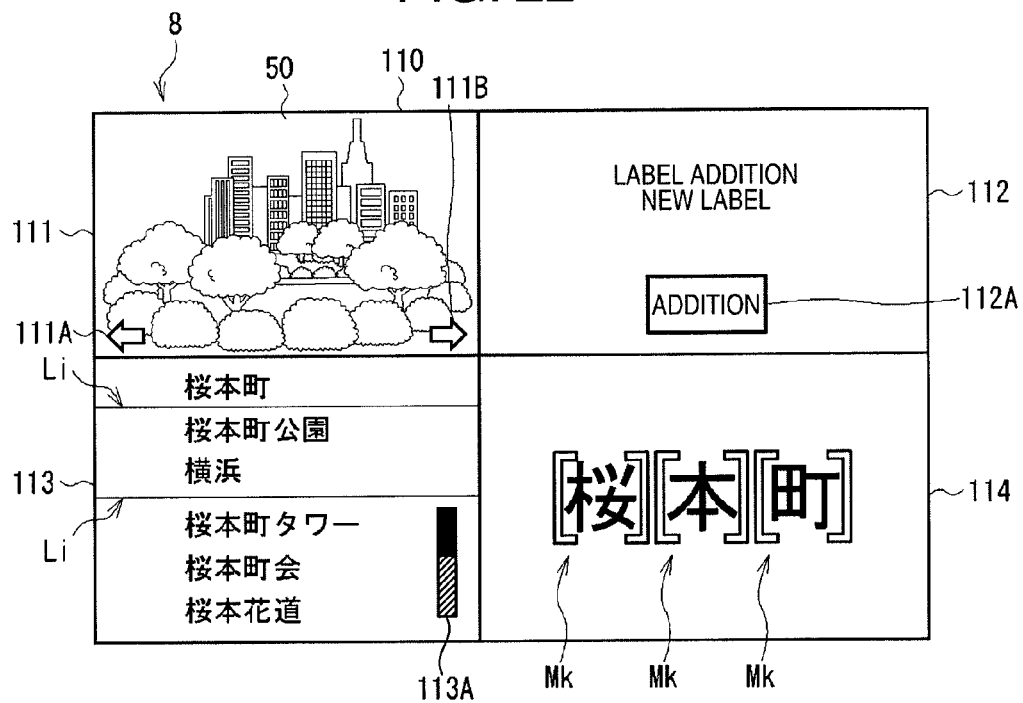
FIG. 22 is a schematic view showing a configuration 1 of the new label addition screen according to another embodiment.

The invention is not limited to the above, and it is preferable that, in the above case, the character string detected at the previous time is not deleted from the area 113 and remains, for example, between the newly detected character string and registered labels which are similar to the character string as shown in FIG. 22. In other words, every time the shutter button 7 is pressed, character strings detected at respective time are added to the area 113. As a result, character strings detected in the past are displayed at the area 113 as logs. The logs will be also candidate labels.

According to the above, when the user desires to add plural labels to the recorded picture, plural detected character strings including logs are displayed at the area 113 as candidate labels by taking subjects in which respective different desired character strings are written continuously in the digital still camera 1.

At this time, the user selects plural candidate labels displayed at the area 113 and pressing the addition button 112A displayed at the area 112, thereby adding plural labels to the recorded picture at a time.

As described above, logs of the detected character strings are displayed at the area 113, thereby further improving usability at the time of adding plural labels to the recorded picture. Particularly, this is effective when the same plural labels are added to plural recorded pictures. The display of similar registered labels of the detected character strings detected in the past which are displayed at the area 113 depends on the case. When they are displayed, for example, similar registered labels with respect to the character string detected at the previous time are displayed below similar registered labels with respect to a character string detected at this time.

The case in which logs of the detected character strings are displayed just below the character string detected at this time is described here, and it is also preferable that, for example, logs can be displayed below the similar registered labels with respect to the character string detected at this time.

3-2 Embodiment 2 in Other Embodiments

Figure 23:
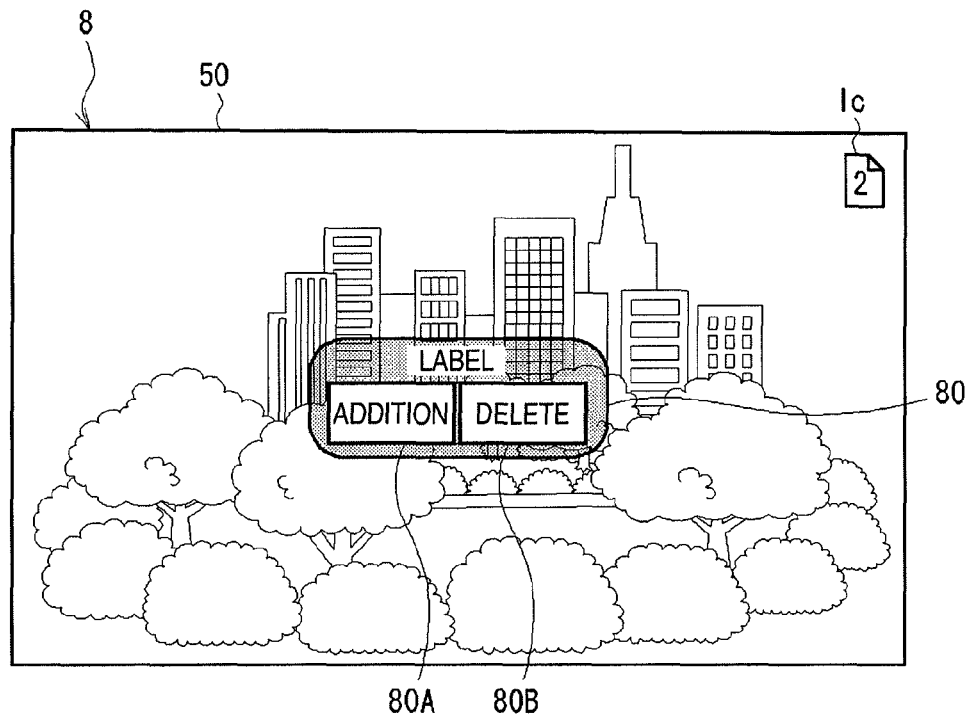
FIG. 23 is a schematic view showing a configuration 1 of the label addition/delete window according to further another embodiment.
Figure 24:
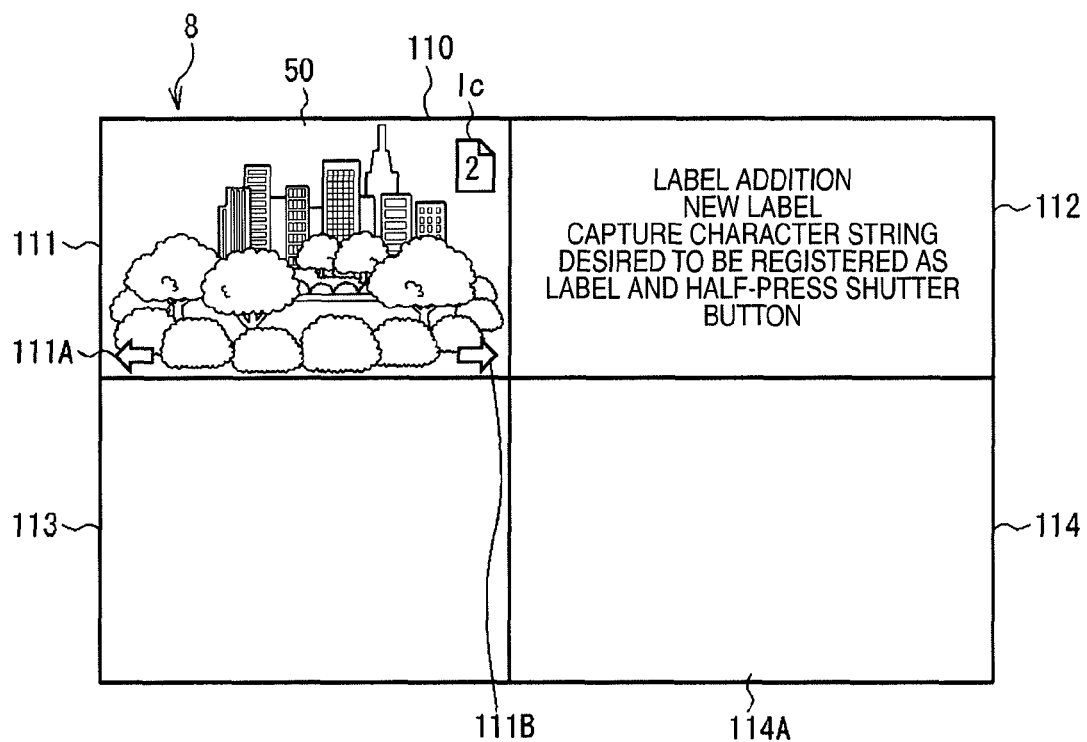
FIG. 24 is a schematic view showing a configuration 2 of the new label addition screen according to further another embodiment.

In the case that the label is added to the recorded picture 50 displayed at the TP display 8, it is preferable that an icon Ic indicating that the label is added is displayed superimposed on a prescribed position (for example, at a corner) of the recorded picture 50 as shown in FIG. 23 and FIG. 24. Further, it is preferable to display a pop-up window in which the label added to the recorded picture 50 is displayed at a prescribed area in the screen (for example, in the vicinity of the icon Ic) under control of the controller 20, when a predetermined touch operation of pressing the icon Ic is performed.

According to the above, it is possible to allow the user to recognize whether the label is added to the recorded picture 50 during display and which label is added if the label is added.

It is also preferable that the label itself is displayed superimposed on the recorded picture 50 instead of the icon Ic. Further, when plural labels are added to the recorded picture 50, the number of labels can be displayed in the icon Ic.

3-3 Embodiment 3 in Other Embodiments

In the above second embodiment, the character string is detected by reading the two-dimensional code, however, it is also preferable that the character string is detected by reading an one-dimensional code. It is further preferable that not only the character recognition and the code reading but also picture analysis with respect to the imaged picture is performed to thereby extract feature points from the imaged picture and to obtain a character string associated with the feature points from a prescribed database.

Figure 25:
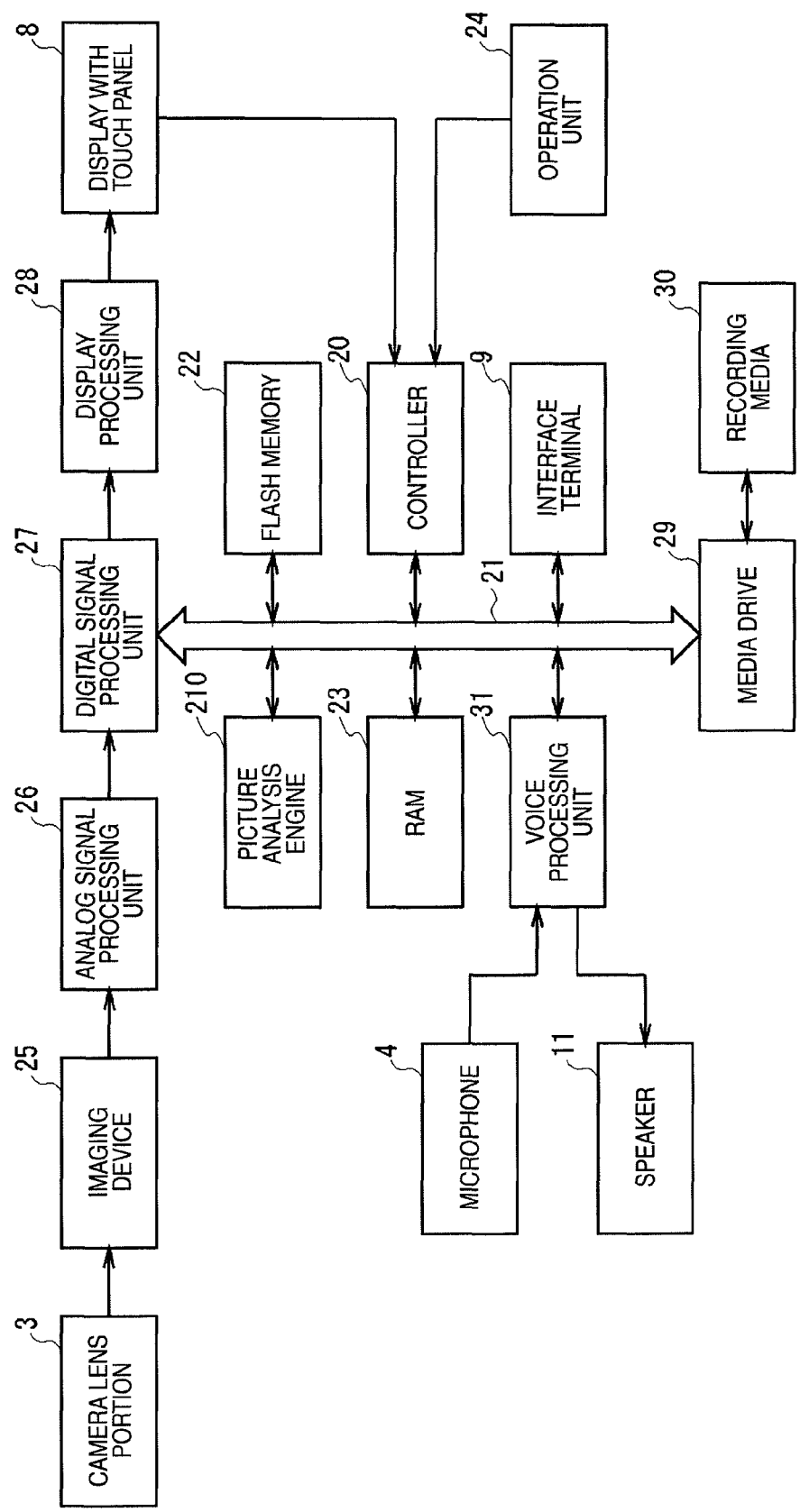
FIG. 25 is a schematic diagram showing an internal configuration of a digital still camera according to further another embodiment.

In this case, a picture analysis engine 210 is provided at the digital still camera 1 instead of the character recognition engine 32 as shown in FIG. 25. In the digital still camera 1, when the shutter button 7 is half-pressed in a state in which the new label addition screen 110 is displayed, the controller 20 performs picture analysis of an imaged picture captured through the imaging device 25 at that time by using the picture analysis engine 210.

As a result, the picture analysis engine 210 extracts feature points from the imaged picture, transmitting them to the controller 20. As feature points, for example, the shape, color, proportion of respective parts and the like can be cited. Concerning algorithm for extracting feature points, existing one can be used.

In the flash memory 22 of the digital still camera 1, a database in which feature points obtained from various imaged pictures in advance and character strings associated with respective feature points are registered is recorded. Therefore, the controller 20 obtains a character string corresponding to the feature points from the database when the feature points are transmitted from the picture analysis engine 210.

Then, the controller 20 displays the character string as a character string detected from the imaged picture at the area 113 of the new label addition screen 110.

The database can be created by using a personal computer (hereinafter, also referred to as a PC). According to this, the database can be created, in which an arbitrary character string (for example, a user's name) inputted by the user is associated with feature points extracted from a picture (for example, a picture of a user's face) taken into the PC by algorithm which is the same as the picture analysis engine 210 by the PC.

The database is recorded in the flash memory 22 of the digital still camera 1 through, for example, the interface terminal 10 or the recording medium 30.

According to the above, when the digital still camera 1 images a user's face at the time of adding a label, it is possible to display a user's name at the area 113 of the new label addition screen 110 as a candidate label.

Consequently, the usability at the time of adding the label to the recorded picture can be further improved.

3-4 Embodiment 4 in Other Embodiments

Figure 26:
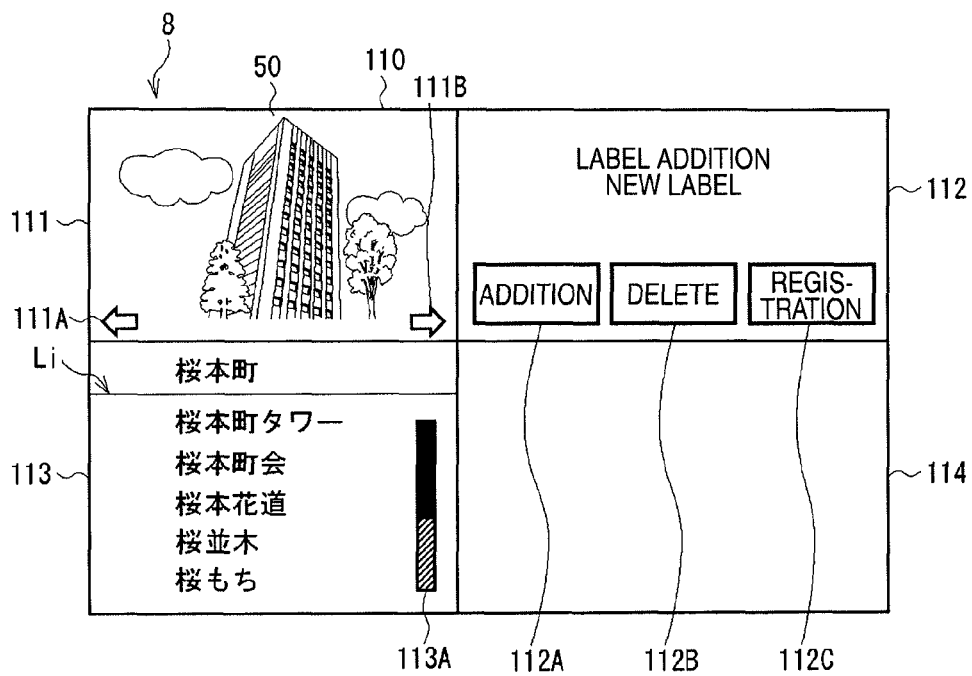
FIG. 26 is a schematic view showing a configuration 3 of the new label addition screen according to further another embodiment.

It is also preferable that a delete button 112B for deleting the added label from the recorded picture is additionally displayed at the area 112 of the new label addition screen 110 displayed on the TP display 8 as shown in FIG. 26. When a predetermined touch operation of pressing the delete button 112B is performed, the controller 20 deletes the added label from the recorded picture 50 displayed at the area 111.

Moreover, it is preferable that a registration button 112C for registering the character string detected from the imaged picture as a new label (not added to the recorded picture 50 during display) is additionally displayed at the area 112. When a predetermined touch operation of pressing the registration button 112C is performed, the controller 20 registers the detected character string displayed at the area 113 in the registered label database as a new label.

According to the above, it is possible to perform various operations concerning labels such as addition of the label, deletion of the added label and registration of the new label on the same new label addition screen 110.

3-5 Embodiment 5 in Other Embodiments

In the above first embodiment, when a predetermined touch operation for adding a label is performed in the state in which one arbitrary recorded picture is selected and the recorded picture is displayed in the TP display 8 (FIG. 5), the label addition/delete window 80 is displayed as shown in FIG. 8.

Figure 27:
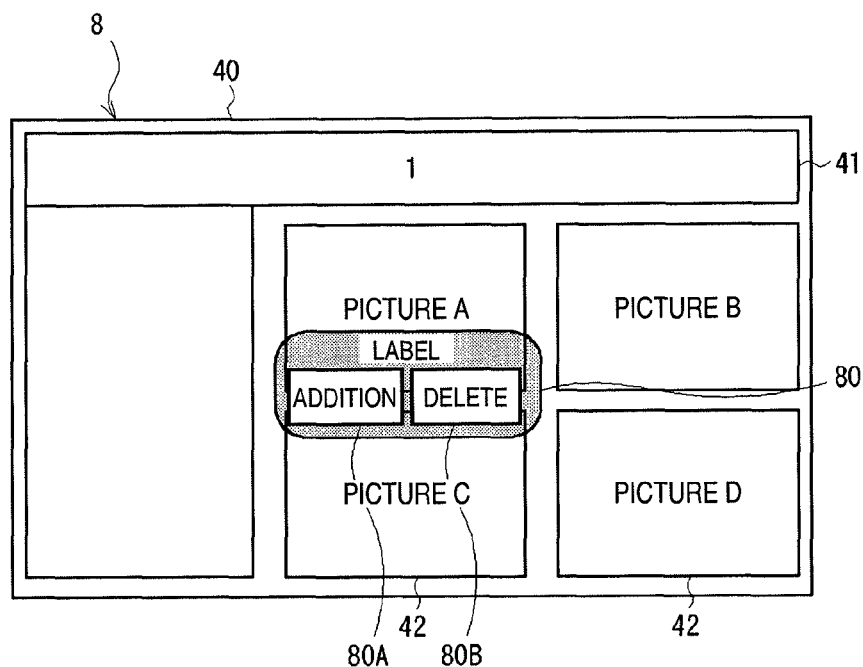
FIG. 27 is a schematic view showing a configuration 2 of the label addition/delete window according to further another embodiment.

The invention is not limited to the above, and it is also preferable that the label addition/delete window 80 is displayed in response to a predetermined touch operation of adding the label even in the state in which the list screen according to the time series group 40 (FIG. 4) is displayed as shown in FIG. 27.

In this case, the digital still camera 1 performs addition of the label or deletion of the added label after that, with respect to all recorded pictures corresponding to displayed thumbnails at a time.

Figure 28:
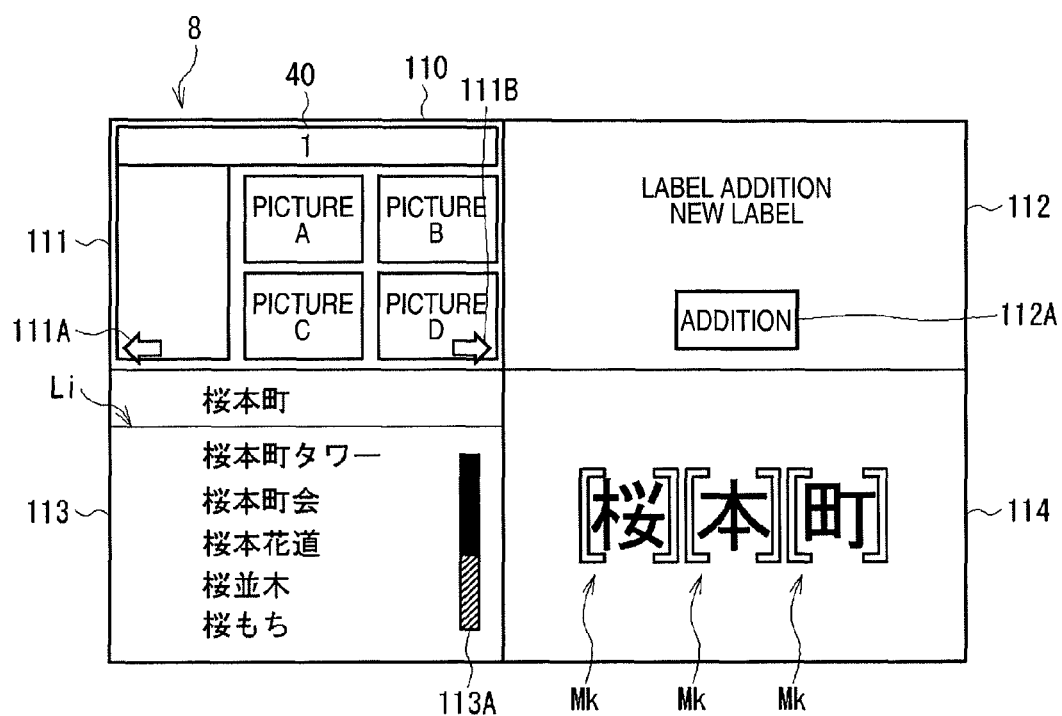
FIG. 28 is a schematic view showing a configuration 4 of the new label addition screen according to further another embodiment.

For example, assume that the new button 90A of the new/registered label addition window 90 is pressed after the addition button 80A of the label addition/delete window 80 is pressed. Then, the controller 20 displays the new label addition screen 110 in which the list screen according to the time series group 40 which has been displayed just before is reduced-displayed at the area 111 on the TP display 8 as shown in FIG. 28.

After that, assume that an arbitrary label is selected from candidate labels displayed at the area 113 of the new label addition screen 110 and the addition button 112A displayed at the area 112 is pressed. Then, the controller 20 adds the label selected from the area 113 with respect to all recorded pictures corresponding to thumbnails displayed on the list screen according to the time series group 40 at the area 111.

According to the above, it is possible to add the label to plural recorded pictures more efficiently in a short time. In this case, addition of the label or deletion of the added label is performed to plural recorded pictures at a time by using the list screen according to the time series group 40, however, it is also possible to perform the same operation when using the list screen according to the picture taken date 60 or the list screen according to the label 70.

3-6 Embodiment 6 in Other Embodiments

Further, in the first embodiment, registered labels which begin with the same character as the first character of the character string detected from the imaged picture are displayed at the area 113 by searching them from the registered label database. The invention is not limited to this, and it is also preferable that registered labels including at least one character in characters included in the detected character string are searched from the registered label database and displayed at the area 113.

3-7 Embodiment 7 in Other Embodiments

Further, in the first embodiment, when the shutter button 7 is half-pressed, picture data of the imaged picture captured through the imaging device 25 at that time is transmitted to the character recognition engine 32 to detect the character string from the imaged picture (still picture). The invention is not limited to this, and it is also preferable that, after switching the display to the new label addition screen 110, picture data of imaged pictures captured through the imaging device 25 is continuously transmitted to the character recognition engine 32, for example, by one frame, thereby detecting the character string from imaged pictures (moving pictures) in real time.

3-8 Embodiment 8 in Other Embodiments

Further, in the above embodiment, picture data is recorded in the recording medium 30 inserted in the slot 9. The invention is not limited to this, and it is also preferable that a flash memory or a hard disc as a substitute for the recording medium 30 is provided in the digital still camera 1 and picture data is recorded therein.

3-9 Embodiment 9 in Other Embodiments

Further, in the above embodiment, various operations such as label addition are performed by the touch panel of the TP display 8. The invention is not limited to this, and it is also preferable that operation buttons as a substitute for the touch panel are provided in the digital still camera 1 and various operations are performed by the operation buttons.

3-10 Embodiment 10 in Other Embodiments

Further, in the above embodiment, the program for executing label addition processing is written in the flash memory 22 in advance. The invention is not limited to this, and it is also preferable that the program is recorded in the recording medium 30, and the digital still camera 1 reads the program from the recording medium 30 and installs the program in the flash memory 22. It is further preferable that the program transmitted from a PC connected through the interface terminal 10 is installed in the flash memory 22.

In this case, the PC side can obtain the program by downloading the program from a prescribed server on a network or reading the program from a prescribed recording medium. As the prescribed recording medium, for example, an optional recording medium such as a CD (Compact Disc), a DVD (Digital Versatile Disc) or a memory card can be used.

3-11 Embodiment 11 in Other Embodiments

Further, in the above embodiment, the camera lens portion 3, the imaging device 25 and the analog signal processing unit 26 are provided at the digital still camera 1 as an imaging unit. Also, the recording medium 30 is mounted on the digital still camera 1 as a picture recording unit. Further, the controller 20 is provided at the digital still camera 1 as a playback unit. Moreover, the character recognition engine 32, the two-dimensional recognition engine 200, the picture analysis engine 210 and the controller 20 are provided at the digital still camera 1 as a character information detection unit.

Further, the controller 20, the digital signal processing unit 27 and the display processing unit 28 are provided at the digital still camera 1 as a display control unit. Further, the controller 20 is provided at the digital still camera 1 as a character information association unit. Further, the shutter button 7 is provided at the digital still camera 1 as an instruction input unit. Further, the flash memory 22 is provided at the digital still camera 1 as a character information recording unit. Further, the controller 20 is provided at the digital still camera 1 as a search unit.

The invention is not limited to this, and it is also preferable that respective function units of the digital still camera 1 described above are formed by other various hardware or software if they have the same functions. For example, it is also preferable to provide hardware taking charge of functions of the playback unit, the character information association unit and the search unit separately by removing these functions from the controller 20. Additionally, it is also preferable that the controller 20 takes charge of the function of the character information detection unit by software.

Additionally, the invention is not limited to the digital still camera 1 if it is an imaging apparatus including the same function, and it can be applied to other various imaging apparatuses such as a digital camcorder, a PC, a game machine, a cellular phone device which have a camera function.

Moreover, the invention is not limited to the digital still camera 1 in which the character string is added to the picture as a label, and can be applied to other various imaging apparatuses if they associate arbitrary character information with the picture.

3-12 Embodiment 12 in Other Embodiments

Further, the invention is not limited to the first and second embodiments and other Embodiments 1 to 11 which have been explained as the above. That is, the application range of the invention extends to forms in which parts or all of the first and second embodiments and other Embodiments 1 to 11 which have been explained as the above are optionally combined or forms in which parts thereof are extracted.

For example, the first embodiment and the second embodiment can be combined. According to this, when a subject in which a character string is written is imaged, the character string is detected by the character recognition engine 32, and when a subject in which a two-dimensional code is written is imaged, the character string is detected by the two-dimensional code recognition engine 200.

Additionally, for example, Embodiment 2 and Embodiment 4 in other embodiments can be combined. According to this, it is possible to delete an arbitrary label from the recorded picture by selecting an arbitrary label from the pop-up window displayed when the icon Ic indicating that the label is added is pressed and by pressing the delete button 112B at the area 112.

The invention can be used for, for example, the digital still camera, the digital camcorder and the like which are capable of adding the label to the picture.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
an imaging unit configured to image a subject having character information and output an imaged picture;
a picture recording unit configured to record the imaged picture;
a playback unit configured to play back the recorded picture recorded in the picture recording unit;
a character information detection unit configured to detect character information from the imaged picture outputted by the imaging unit and recognize a character string as a candidate label from the detected character information;
a display control unit configured to display the recorded picture played back by the playback unit and the imaged picture outputted from the imaging unit on the same screen; and a character information association unit configured to receive a user selection of the candidate label and to then associate the selected label as a searchable element in a picture management database with the recorded picture displayed on the same screen, wherein the recorded picture and the associated label are displayed simultaneously in separate areas on the same screen, and the imaging of the subject, the detection of the character information from the imaged picture, and the selection of the candidate label are each caused by the user to be carried out using a same switch in the imaging apparatus.

2. The imaging apparatus according to claim 1, wherein, in addition to the recorded picture played back by the playback unit and the imaged picture outputted from the imaging unit, character information detected from the imaged picture by the character information detection unit is displayed on the screen.

3. The imaging apparatus according to claim 2, further comprising:

a character information recording unit configured to record character information associated with the recorded picture by the character information association unit; and a search unit configured to search character information including at least one character of characters included in character information displayed on the screen from the character information recording unit, and wherein the display control unit displays character information searched by the search unit on the screen, in addition to the recorded picture played back by the playback unit, the imaged picture outputted from the imaging unit and character information detected by the character information detection unit, and wherein the character information association unit associates character information detected by the character information detection unit and character information selected from character information searched by the search unit with the recorded picture.

4. The imaging apparatus according to claim 1, wherein the playback unit plays back plural recorded pictures, wherein the display control unit displays the plural recorded pictures played back by the playback unit in a list on the screen and wherein the character information association unit associates the selected label with respective plural recorded pictures displayed in a list on the screen.

5. The imaging apparatus according to claim 1, wherein the character information detection unit detects character information from the imaged picture outputted from the imaging unit every time the instruction is inputted using the switch in the imaging apparatus.

6. The imaging apparatus according to claim 5, wherein the display control unit additionally displays detected character information on the screen every time character information is detected by the character information detection unit as a plurality of such candidate labels, and wherein the character information association unit associates, with the recorded picture, character information selected by the user from among the plurality of candidate labels displayed on the screen as the selected label.

7. The imaging apparatus according to claim 5, wherein the switch in the imaging apparatus is a shutter button which inputs the instruction instructing the character information detection unit to detect character information every time the shutter button is half-pressed.

8. The imaging apparatus according to claim 1, wherein the picture indicates either a still picture or a moving picture, or both pictures.

9. The imaging apparatus according to claim 1, wherein the picture recording unit is a removable recording medium.

10. The imaging apparatus according to claim 1, wherein the character information association unit associates the selected label and a label name of the selected label in the picture management database with the recorded picture.

11. A character information association method for an imaging apparatus, the method comprising:

imaging a subject having character information and outputting an imaged picture by an imaging unit as well as playing back a recorded picture recorded in a picture recording unit by a playback unit;

detecting character information from the imaged picture and recognizing a character string as a candidate label from the detected character information;

displaying the recorded picture played back by the playback unit and the imaged picture outputted from the imaging unit on the same screen by a display control unit; and receiving a user selection of the candidate label and then associating the selected label as a searchable element in a picture management database with the recorded picture displayed on the same screen by the character information association unit, wherein the recorded picture and the associated label are displayed simultaneously in separate areas on the same screen, and the imaging of the subject, the detection of the character information from the imaged picture, and the selection of the candidate label are each caused by the user to be carried out using a same switch in the imaging apparatus.

12. The character information association method according to claim 11, wherein the selected label and a label name of the selected label are associated in the picture management database with the recorded picture.

13. A non-transitory computer readable medium for storing a character information association program allowing an imaging apparatus to execute:

a step of imaging a subject having character information and outputting an imaged picture by an imaging unit as well as playing back a recorded picture recorded in a picture recording unit by a playback unit, detecting character information from the imaged picture and recognizing a character string as a candidate label from the detected character information;

a step of displaying the recorded picture played back by the playback unit and the imaged picture outputted by the imaging unit on the same screen by a display control unit, and a step of receiving a user selection of the candidate label and then associating the selected label as a searchable element in a picture management database with the recorded picture displayed on the same screen by the character information association unit, wherein the recorded picture and the associated label are displayed simultaneously in separate areas on the same screen, and the imaging of the subject, the detection of the character information from the imaged picture, and the selection of the candidate label are each caused by the user to be carried out using a same switch in the imaging apparatus.

14. The non-transitory computer readable medium according to claim 13, wherein the step of associating the selected label further associates a label name of the selected label in the picture management database with the recorded picture.

* * * * *